US011918161B2

(12) United States Patent
Chen

(10) Patent No.: US 11,918,161 B2
(45) Date of Patent: *Mar. 5, 2024

(54) FLOOR CLEANING MACHINES HAVING INTELLIGENT SYSTEMS, ASSOCIATED SUB-ASSEMBLIES INCORPORATING INTELLIGENT SYSTEMS, AND ASSOCIATED METHODS OF USE

(71) Applicant: INTELLIGENT CLEANING EQUIPMENT HOLDINGS CO., LTD., Tortola (VG)

(72) Inventor: Nai Pong Simon Chen, Guangdong (CN)

(73) Assignee: Intelligent Cleaning Equipment Holdings Co., Ltd., Tortola (VG)

( * ) Notice: Subject to any disclaimer, the term of this patent is extended or adjusted under 35 U.S.C. 154(b) by 0 days.

This patent is subject to a terminal disclaimer.

(21) Appl. No.: 17/937,976

(22) Filed: Oct. 4, 2022

(65) Prior Publication Data

US 2023/0233047 A1 Jul. 27, 2023

Related U.S. Application Data

(63) Continuation of application No. 16/933,403, filed on Jul. 20, 2020, now Pat. No. 11,490,775, which is a
(Continued)

(51) Int. Cl.
*A47L 11/40* (2006.01)
*A47L 11/283* (2006.01)
(Continued)

(52) U.S. Cl.
CPC ......... *A47L 11/4011* (2013.01); *A47L 11/283* (2013.01); *A47L 11/4008* (2013.01);
(Continued)

(58) Field of Classification Search
CPC ............... A47L 11/283; A47L 11/4008; A47L 11/4013; A47L 11/4044; A47L 11/4055;
(Continued)

(56) References Cited

U.S. PATENT DOCUMENTS 3,204,280 A 9/1965 Cleatis et al.
3,702,488 A 11/1972 Kasper
(Continued)

FOREIGN PATENT DOCUMENTS

CN 1630484 A 6/2005
CN 101292853 A 10/2008
(Continued)

OTHER PUBLICATIONS

Co-pending U.S. Appl. No. 18/194,310, inventor Chen; Nai Pong Simon, filed on Mar. 31, 2023.
(Continued)

*Primary Examiner* — Sisay Yacob
(74) *Attorney, Agent, or Firm* — Wilson Sonsini Goodrich & Rosati

(57) ABSTRACT

A floor cleaning machine having an intelligent system including a recovery tank sub-assembly, a vacuum fan sub-assembly, a solution tank sub-assembly, wherein the solution tank sub-assembly preferably includes a secondary electrochemical cell, a solution flow sub-assembly, a control console sub-assembly, a frame and wheel sub-assembly and/or a frame and transaxle sub-assembly, a scrub head sub-assembly, a scrub head lift sub-assembly, a squeegee sub-assembly, a solution flow sub-assembly, and an intelligent system associated with at least one of the above-identified sub-assemblies, wherein the intelligent system at least one of selectively gathers, obtains, monitors, stores, records, and analyzes data associated with components of the floor cleaning machine assembly, and at least one of
(Continued)

controllably communicates and disseminates such data with at least one of another system and user.

20 Claims, 20 Drawing Sheets

Related U.S. Application Data continuation of application No. 16/595,943, filed on Oct. 8, 2019, now Pat. No. 10,729,301, which is a continuation of application No. 16/026,649, filed on Jul. 3, 2018, now Pat. No. 10,433,694, which is a continuation of application No. 14/666,904, filed on Mar. 24, 2015, now Pat. No. 10,076,220.

(60) Provisional application No. 61/969,559, filed on Mar. 24, 2014.

(51) Int. Cl.
  *G06Q 10/20* (2023.01)
  *G06Q 30/0601* (2023.01)
  *H04Q 9/00* (2006.01)

(52) U.S. Cl.
  CPC ....... *A47L 11/4013* (2013.01); *A47L 11/4044* (2013.01); *A47L 11/4055* (2013.01); *A47L 11/4061* (2013.01); *A47L 11/4083* (2013.01); *G06Q 10/20* (2013.01); *G06Q 30/0633* (2013.01); *H04Q 9/00* (2013.01); *H04Q 2209/43* (2013.01); *H04Q 2209/823* (2013.01)

(58) Field of Classification Search
  CPC . A47L 11/4061; A47L 11/4083; G06Q 10/20; G06Q 30/0633; H04Q 9/00; H04Q 2209/43; H04Q 2209/823
  See application file for complete search history.

(56) References Cited

U.S. PATENT DOCUMENTS

| | | | |
|---|---|---|---|
| 3,761,987 A | 10/1973 | Nayfa et al. | |
| 3,879,789 A | 4/1975 | Kasper | |
| 3,974,541 A | 8/1976 | Silvis et al. | |
| 4,369,544 A | 1/1983 | Parisi | |
| 4,580,313 A | 4/1986 | Blehert | |
| 4,667,364 A * | 5/1987 | Meili | A47L 11/4016 15/353 |
| 4,675,935 A * | 6/1987 | Kasper | A47L 11/4011 15/319 |
| 4,716,621 A | 1/1988 | Zoni | |
| 4,819,676 A | 4/1989 | Blehert et al. | |
| 4,831,684 A | 5/1989 | Duncan | |
| 5,093,955 A | 3/1992 | Blehert et al. | |
| 5,239,720 A | 8/1993 | Wood et al. | |
| 5,265,300 A | 11/1993 | O'Hara et al. | |
| 5,435,035 A * | 7/1995 | Fujimoto | A47L 11/4005 15/49.1 |
| 5,566,422 A | 10/1996 | Geyer | |
| 5,621,301 A | 4/1997 | Allen et al. | |
| 6,519,808 B2 | 2/2003 | Legatt et al. | |
| 6,532,672 B1 | 3/2003 | Gottlieb | |
| 6,585,827 B2 | 7/2003 | Field et al. | |
| 7,199,711 B2 | 4/2007 | Field | |
| 7,269,877 B2 * | 9/2007 | Tondra | A47L 9/2889 15/319 |
| 7,403,360 B2 | 7/2008 | Cunningham | |
| 7,448,114 B2 | 11/2008 | Basham et al. | |
| 7,461,430 B2 | 12/2008 | Reick-Mitrisin et al. | |
| 7,533,435 B2 | 5/2009 | Pedlar et al. | |
| 7,891,046 B2 | 2/2011 | Field et al. | |
| 8,584,294 B2 * | 11/2013 | Loring | A47L 11/4038 15/49.1 |
| 8,719,999 B2 | 5/2014 | Field | |
| 9,480,379 B2 | 11/2016 | Yoon et al. | |
| 9,943,206 B2 | 4/2018 | Yang et al. | |
| 10,010,230 B2 | 7/2018 | Chen | |
| 10,016,112 B2 | 7/2018 | Chen | |
| 10,016,113 B2 | 7/2018 | Chen | |
| 10,076,220 B2 | 9/2018 | Chen | |
| 10,251,522 B2 | 4/2019 | Chen | |
| 10,433,694 B2 | 10/2019 | Chen | |
| 10,548,446 B2 | 2/2020 | Chen | |
| 10,548,447 B2 | 2/2020 | Chen | |
| 10,602,901 B2 | 3/2020 | Chen | |
| 10,729,301 B2 | 8/2020 | Chen | |
| 10,932,639 B2 | 3/2021 | Chen | |
| 11,071,432 B2 | 7/2021 | Chen | |
| 11,369,246 B2 | 6/2022 | Chen | |
| 11,490,775 B2 | 11/2022 | Chen | |
| 11,641,998 B2 | 5/2023 | Chen | |
| 2001/0004719 A1 | 6/2001 | Sommer | |
| 2002/0156556 A1 | 10/2002 | Ruffner | |
| 2003/0136666 A1 | 7/2003 | Ophardt | |
| 2005/0254185 A1 * | 11/2005 | Cunningham | H01R 13/7175 361/23 |
| 2006/0150362 A1 | 7/2006 | Mitchell | |
| 2006/0204383 A1 | 9/2006 | Kushida et al. | |
| 2007/0186367 A1 | 8/2007 | Field et al. | |
| 2007/0186368 A1 | 8/2007 | Field et al. | |
| 2007/0186369 A1 * | 8/2007 | Field | A47L 11/302 15/320 |
| 2007/0240276 A1 | 10/2007 | Pedlar | |
| 2007/0250212 A1 | 10/2007 | Halloran et al. | |
| 2008/0284363 A1 | 11/2008 | Lucas et al. | |
| 2009/0254240 A1 | 10/2009 | Olsen, III et al. | |
| 2012/0097201 A1 * | 4/2012 | Field | A61L 2/186 134/58 R |
| 2012/0271645 A1 * | 10/2012 | Dain | G06Q 10/00 705/1.1 |
| 2013/0274920 A1 | 10/2013 | Abramson et al. | |
| 2014/0116469 A1 | 5/2014 | Kim et al. | |
| 2014/0156035 A1 | 6/2014 | Groschen et al. | |
| 2014/0214205 A1 | 7/2014 | Kwon et al. | |
| 2014/0247941 A1 | 9/2014 | Gu et al. | |
| 2014/0366317 A1 | 12/2014 | Wydra | |
| 2015/0045990 A1 * | 2/2015 | Shih | A47L 11/4061 701/2 |
| 2016/0195577 A1 * | 7/2016 | Osaka | G01N 27/4161 204/407 |
| 2017/0049288 A1 | 2/2017 | Knutson et al. | |
| 2017/0205822 A1 | 7/2017 | Shin et al. | |
| 2018/0008113 A1 | 1/2018 | Sedam | |
| 2018/0360286 A1 | 12/2018 | Habbas et al. | |
| 2021/0204786 A1 | 7/2021 | Chen | |

FOREIGN PATENT DOCUMENTS

| | | |
|---|---|---|
| CN | 101421054 A | 4/2009 |
| CN | 102571905 A | 7/2012 |
| CN | 202830837 U | 3/2013 |
| CN | 103154955 A | 6/2013 |
| CN | 103167821 A | 6/2013 |
| CN | 203034105 U | 7/2013 |
| CN | 103866728 A | 6/2014 |
| EP | 0940735 A2 | 9/1999 |
| EP | 1755431 A1 | 2/2007 |
| EP | 1755431 B1 | 7/2013 |
| EP | 2628427 A2 | 8/2013 |
| KR | 20120016403 A | 2/2012 |
| KR | 1020130027345 | 3/2013 |
| WO | WO-03041554 A1 | 5/2003 |
| WO | WO-2007092597 A2 | 8/2007 |
| WO | WO-2015106142 A1 | 7/2015 |
| WO | WO-2015148501 A1 | 10/2015 |
| WO | WO-2015148553 A1 | 10/2015 |

OTHER PUBLICATIONS

EP15767951.5 European Search Opinion dated Jan. 9, 2018.
EP15768085.1 European Search Report dated Jan. 9, 2018.

(56) References Cited

OTHER PUBLICATIONS

PCT/US15/022239 Search Report & Written Opinion dated Jul. 16, 2015.
PCT/US15/022310 Search Report and Written Opinion dated Jul. 16, 2015.
U.S. Appl. No. 15/152,179 Office Action dated Aug. 15, 2017.
U.S. Appl. No. 14/666,904 Notice of Allowance dated Apr. 26, 2018.
U.S. Appl. No. 14/666,904 Office Action dated Aug. 30, 2016.
U.S. Appl. No. 14/666,904 Office Action dated Jun. 22, 2017.
U.S. Appl. No. 14/666,904 Office Action dated Mar. 23, 2016.
U.S. Appl. No. 14/667,507 Notice of Allowance dated Apr. 27, 2018.
U.S. Appl. No. 14/667,507 Office Action dated Aug. 30, 2016.
U.S. Appl. No. 14/667,507 Office Action dated Jun. 22, 2017.
U.S. Appl. No. 14/667,507 Office Action dated Mar. 24, 2016.
U.S. Appl. No. 15/152,179 Notice of Allowance dated May 18, 2018.
U.S. Appl. No. 15/152,179 Office Action dated Jul. 13, 2016.
U.S. Appl. No. 15/152,816 Notice of Allowance dated May 24, 2018.
U.S. Appl. No. 15/152,816 Office Action dated Aug. 15, 2017.
U.S. Appl. No. 15/152,816 Office Action dated Jul. 13, 2016.
U.S. Appl. No. 16/026,602 Notice of Allowance dated Nov. 12, 2019.
U.S. Appl. No. 16/026,602 Office Action dated Aug. 27, 2018.
U.S. Appl. No. 16/026,602 Office Action dated Aug. 7, 2019.
U.S. Appl. No. 16/026,602 Office Action dated Jan. 3, 2019.
U.S. Appl. No. 16/026,602 Office Action dated May 22, 2019.
U.S. Appl. No. 16/026,649 Notice of Allowance dated Jul. 18, 2019.
U.S. Appl. No. 16/026,649 Office Action dated Aug. 10, 2018.
U.S. Appl. No. 16/026,649 Office Action dated Dec. 10, 2018.
U.S. Appl. No. 16/026,649 Office Action dated May 13, 2019.
U.S. Appl. No. 16/026,716 Notice of Allowance dated Jan. 10, 2020.
U.S. Appl. No. 16/026,716 Office Action dated Aug. 7, 2018.
U.S. Appl. No. 16/026,716 Office Action dated Dec. 26, 2018.
U.S. Appl. No. 16/026,716 Office Action dated May 22, 2019.
U.S. Appl. No. 16/026,716 Office Action dated Nov. 19, 2019.
U.S. Appl. No. 16/026,773 Notice of Allowance dated Feb. 5, 2019.
U.S. Appl. No. 16/026,773 Notice of Allowance dated Jan. 7, 2019,.
U.S. Appl. No. 16/026,773 Office Action dated Aug. 10, 2018.
U.S. Appl. No. 16/379,753 Notice of Allowance dated Nov. 12, 2019.
U.S. Appl. No. 16/379,753 Notice of Allowance dated Nov. 8, 2019.
U.S. Appl. No. 16/379,753 Office Action dated Aug. 7, 2019.
U.S. Appl. No. 16/595,943 Notice of Allowance dated Jun. 10, 2020.
U.S. Appl. No. 16/595,943 Office Action dated Mar. 6, 2020.
U.S. Appl. No. 16/595,943 Office Action dated Nov. 26, 2019.
U.S. Appl. No. 16/781,345 Notice of Allowance dated Apr. 21, 2021.
U.S. Appl. No. 16/781,345 Office Action dated Aug. 27, 2020.
U.S. Appl. No. 16/781,345 Office Action dated Feb. 18, 2021.
U.S. Appl. No. 16/781,345 Office Action dated Mar. 18, 2020.
U.S. Appl. No. 16/781,405 Notice of Allowance dated Aug. 25, 2020.
U.S. Appl. No. 16/781,405 Notice of Allowance dated Nov. 20, 2020.
U.S. Appl. No. 16/781,405 Office Action dated Mar. 19, 2020.
U.S. Appl. No. 16/826,270 Notice of Allowance dated Feb. 24, 2022.
U.S. Appl. No. 16/826,270 Office Action dated Aug. 4, 2021.
U.S. Appl. No. 16/933,403 Notice of Allowance dated Aug. 31, 2022.
U.S. Appl. No. 16/933,403 Notice of Allowance dated Sep. 22, 2022.
U.S. Appl. No. 16/933,403 Office Action dated May 26, 2022.
U.S. Appl. No. 17/150,714 Notice of Allowance dated Jan. 10, 2023.
U.S. Appl. No. 17/150,714 Notice of Allowance dated Jan. 19, 2023.
U.S. Appl. No. 17/150,714 Notice of Allowance dated Mar. 31, 2023.
U.S. Appl. No. 17/150,714 Office Action dated Sep. 9, 2022.

\* cited by examiner

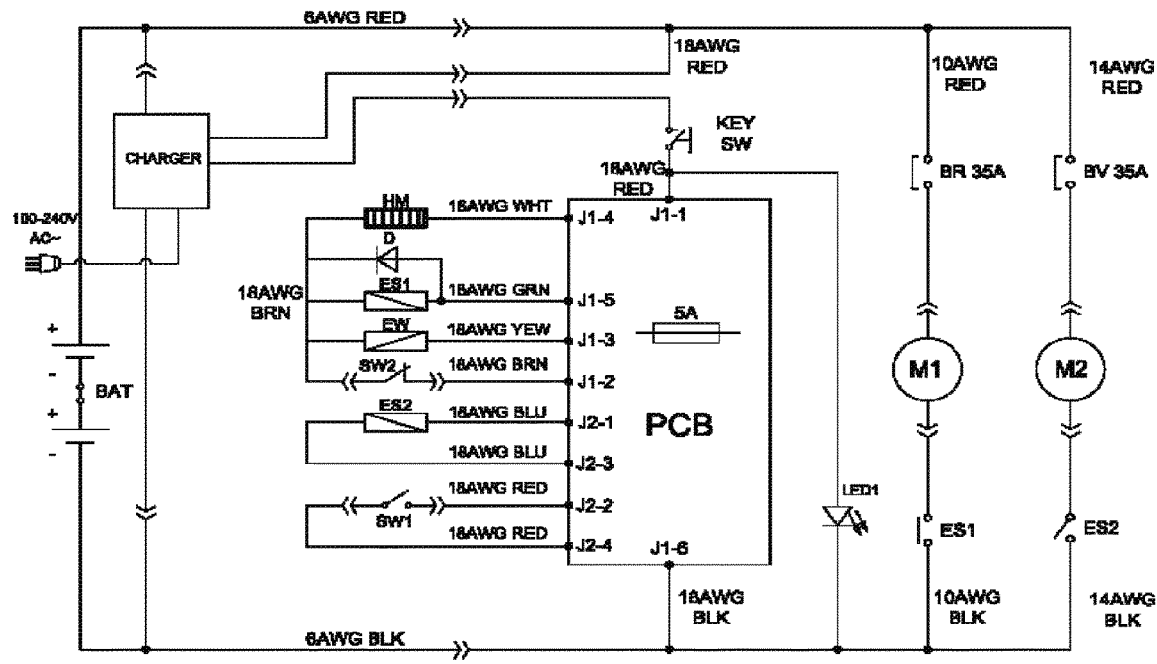

BAT: 2-12V Batteries
CHARGER: On board battery charger
KEY SW: Main power Key switch
HM: Hour meter
D: Diode
ES1: Brush motor solenoid switch
EW: Solution solenoid valve switch
SW2: Safe switch, Scrub head lifting
ES2: Vacuum motor relay ES2: Vacuum motor relay
SW1: Control handle start bail switch
PCB: Function electronic board
LED1: Running lights
BR: Circuit breaker, Brush motor
BV: Circuit breaker, Vacuum motor
M1: Brush motor
M2: Vacuum motor

Figure 13A

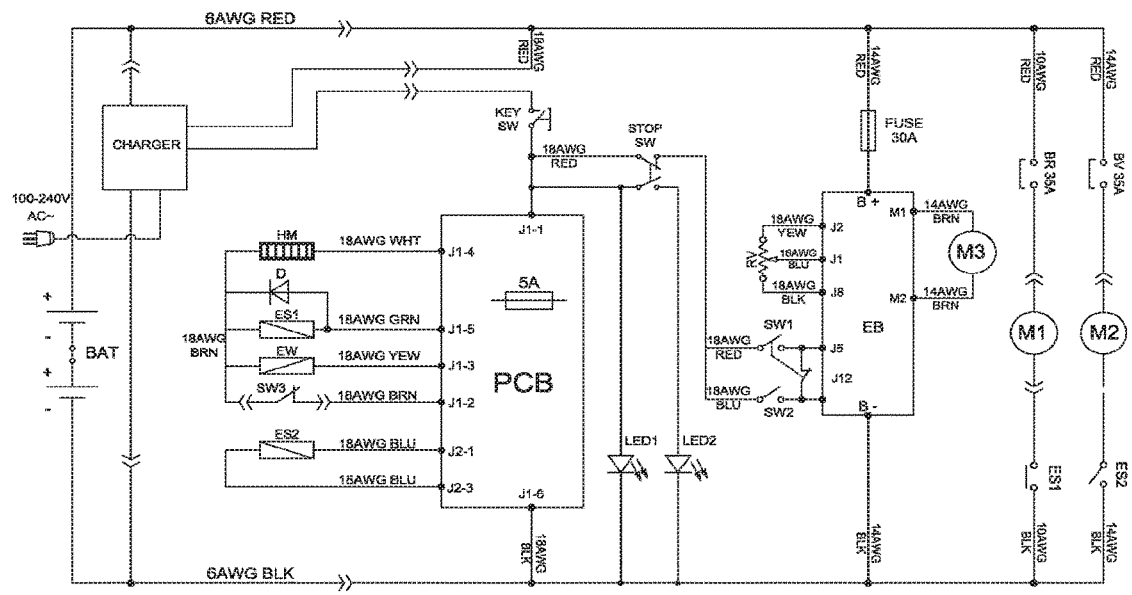

BAT: 2-12V Batteries
CHARGER: On board battery charger
KEY SW: Main power Key switch
HM: Hour meter
D: Diode
ES1: Brush motor solenoid switch
EW: Solution solenoid valve switch
SW3: Safe switch, scrub head lifting
ES2: Vacuum motor relay
PCB: Function electronic board
STOP SW: Emergency stop switch LED1: Running lights
LED2: Emergency stop lights
RV: Speed potentiometer
SW1: Control handle bail switch, forward
SW2: Control handle bail switch, backward
EB: Speed control board
M3: Transaxle motor
BR: Circuit breaker, Brush motor
BV: Circuit breaker, Vacuum motor
M1: Brush motor
M2: Vacuum motor

Figure 13B

FLOOR CLEANING MACHINES HAVING INTELLIGENT SYSTEMS, ASSOCIATED SUB-ASSEMBLIES INCORPORATING INTELLIGENT SYSTEMS, AND ASSOCIATED METHODS OF USE

CROSS-REFERENCE TO RELATED APPLICATIONS

This application is a continuation of U.S. application Ser. No. 16/933,403, filed Jul. 20, 2020, now U.S. Pat. No. 11,490,775, which is a continuation of U.S. application Ser. No. 16/595,943, filed Oct. 8, 2019, now U.S. Pat. No. 10,729,301, which is a continuation of U.S. application Ser. No. 16/026,649, filed Jul. 3, 2018, now U.S. Pat. No. 10,433,694, which is a continuation of U.S. application Ser. No. 14/666,904, filed Mar. 24, 2015, now U.S. Pat. No. 10,076,220, which claims the benefit of U.S. Provisional Application Ser. No. 61/969,559, filed Mar. 24, 2014, all of which are hereby incorporated herein by reference in their entirety—including all references and appendices cited therein.

BACKGROUND OF THE INVENTION

1. Field of the Invention

The present invention relates in general to floor cleaning machines and, more particularly, to floor cleaning machines having intelligent systems that have the capacity to selectively gather, obtain, monitor, store, record, and analyze data associated with components of the floor cleaning machines and controllably communicate and disseminate such data with other systems and users. The present invention further relates to floor cleaning machine sub-assemblies including, but not limited to, secondary electrochemical cells having intelligent systems, as well as associated methods for using the same.

2. Background Art

Floor cleaning machines and associated systems have been known in the art for years and are the subject of a plurality of patents and/or publications, including: U.S. Pat. No. 8,584,294 entitled "Floor Cleaner Scrub Head Having a Movable Disc Scrub Member," U.S. Pat. No. 7,448,114 entitled "Floor Sweeping and Scrubbing Machine," U.S. Pat. No. 7,269,877 entitled "Floor Care Appliance with Network Connectivity," U.S. Pat. No. 7,199,711 entitled "Mobile Floor Cleaner Data Communication," U.S. Pat. No. 5,265,300 entitled "Floor Scrubber," U.S. Pat. No. 5,239,720 entitled "Mobile Surface Cleaning Machine," U.S. Pat. No. 5,093,955 entitled "Combined Sweeper and Scrubber," U.S. Pat. No. 4,831,684 entitled "Cleaning Vehicles," U.S. Pat. No. 4,819,676 entitled "Combination Sweeping and Scrubbing System and Method," U.S. Pat. No. 4,716,621 entitled "Floor and Bounded Surface Sweeper Machine," U.S. Pat. No. 4,667,364 entitled "Floor-Cleaning Machine," U.S. Pat. No. 4,580,313 entitled "Walk Behind Floor Maintenance Machine," and European Patent Number 2,628,427 A2 entitled "Suction Device with a Suction Device Transmitter and External Communication Device Thereof,"—all of which are hereby incorporated herein by reference in their entirety including all references cited therein.

U.S. Pat. No. 8,584,294 appears to disclose a scrub head that includes a first disc scrub member, a movable support having first and second positions, and a movable disc scrub member. The first disc scrub member is rotatable about a first vertical axis. The movable disc scrub member is rotatable about a second vertical axis and is connected to the movable support. The movable disc scrub member is configured to move relative to the first disc scrub member along first and second orthogonal axes of a horizontal plane, which is transverse to the first and second vertical axes, between first and second positions respectively corresponding to the first and second positions of the movable support.

U.S. Pat. No. 7,448,114 appears to disclose a hard floor sweeping and scrubbing machine which includes a mobile body comprising a frame supported on wheels for travel over a surface, a motorized cleaning head, a waste hopper, a hopper lift and a vacuum squeegee. The motorized cleaning head is attached to the mobile body and is configured to perform sweeping and scrubbing operations on the surface. The waste hopper is positioned on a rear side of the cleaning head and is configured to receive waste discharged from the cleaning head during the surface sweeping operations. The hopper lift is configured to raise the waste hopper from an operating position, in which the waste hopper is positioned adjacent the cleaning head, to a dumping position, in which the waste hopper is positioned to dump waste collected in the waste hopper. In one embodiment, the vacuum squeegee is attached to the hopper lift. Also disclosed is a method of cleaning a surface using embodiments of the machine.

U.S. Pat. No. 7,269,877 appears to disclose a floor care appliance that includes a microprocessor based control arrangement having a communications port for connection to a computer. Once connected to a computer, software updates for the microprocessor may be downloaded or diagnostic information stored in the microprocessor's memory may be uploaded for diagnostic purposes. In one embodiment of the invention, the communication port is configured to be connected to a local computer for possible further connection to a remote computer over a computer or telephone network. In an alternate embodiment of the invention, the communication port is configured to connect to and dial up a remote computer over a telephone network.

U.S. Pat. No. 7,199,711 appears to disclose a method of communicating data from a mobile floor cleaner to a remote receiver a data communication is initiated from a communicator of the mobile floor cleaner to the remote receiver and data is communicated to the remote receiver with the communicator.

U.S. Pat. No. 5,265,300 appears to disclose a floor scrubbing vehicle having scrub brushes mounted at the rear of the vehicle by a mechanism which allows both the brushes and squeegee to extend and retract transversely with respect to the vehicle. The mechanism is resilient, and allows the scrub brushes and squeegee to automatically retract inward upon contact with an immovable obstacle, and also causes automatic extension of the brushes and squeegee following passage of the obstacle. The scrub brushes and squeegee are mounted in a scrubbing pod frame which can rotate about a vertical axis with respect to the vehicle to prevent damage, or to facilitate access for repair and maintenance.

U.S. Pat. No. 5,239,720 appears to disclose a surface cleaning machine as a combination sweeping-scrubbing apparatus including a sweeping brush for sweeping debris into a hopper and a one piece squeegee for picking up solution after four staggered, disc brushes. The squeegee is U-shaped having a longitudinal extent greater than that of the disc brushes located intermediate the legs of the squeegee. The drive wheel is located in front of the disc brushes, the squeegee and the solution applying means. The squeegee is raised and lowered relative to the frame by an actuator which pivots an L-shaped member, the leg of which abuts against and pivots a lever interconnected to the mount or the squeegee by a turnbuckle. The hopper is raised and simultaneously tilted by a single cylinder which pivots the upper arm of a parallelogram including a lower arm. The hopper is pivotally mounted to an end of a hopper arm, the opposite end of which is pivotally mounted to the end of the upper arm, and is further pivotally mounted to the end of the lower arm. The hopper is simultaneously tilted at a generally constant dump angle as the hopper is raised from a lowered position in a horizontal debris collecting condition to a raised position with the hopper in a dumping condition.

U.S. Pat. No. 5,093,955 appears to disclose a combination floor sweeping and scrubbing machine which is as compact and maneuverable as an equivalent machine which only sweeps or scrubs, while retaining typical hopper and tank volumes. Its operator can change it from sweeping to scrubbing or vice versa at any time by moving a few controls and without adding or removing any parts. It has one debris hopper and one horizontal cylindrical rotating brush and they function in both the sweeping and scrubbing modes. A vacuum system supplies dust control during sweeping and vacuum pickup of dirty solution during scrubbing. In the scrubbing mode a single tank supplies scrubbing solution and receives dirty solution picked up from the floor.

U.S. Pat. No. 4,831,684 appears to disclose a self-propelled sweeper vehicle that has front steerable wheels mounted on a centrally pivoted axle assembly which also carries the nozzle and brush gear whereby these assemblies are steered in unison with the vehicle. The nozzle front edge is convex and promotes non-turbulent air intake. The nozzle is formed as a hollow rotationally molded structure of a plastics material having inherent structural strength and stiffness. The brush gear is mounted on linkages comprising inner and outer portions pivotally connected for folding movement to resiliently yield under impact. The brush covers are formed as hollow plastics moldings and part of the brush support structure.

U.S. Pat. No. 4,819,676 appears to disclose a machine and/or system as well as a method of operation and an assembly whereby a sweeping unit may be quickly converted into a scrubbing unit and vice versa. The system is capable of operation either in a sweeping mode or a scrubbing mode and is also adaptable to include a vacuum wand assembly when the unit is to be operated in its sweeping mode.

U.S. Pat. No. 4,716,621 appears to disclose a sweeper machine for floors and bounded surfaces, e.g. the floors of workshops and warehouses, courtyards, having engaged with the machine frame, a removable container for collecting the swept trash supported by pivotally-mounted guides engaged by swivel members extending in a crosswise direction to the machine's longitudinal axis and cooperating to define a small frame intervening sealingly between a suction assembly in the frame and a suction mouth of the container, and with snap-action hook-up elements provided between the frame and the pivotally mounted guides and spring members projecting from the frame and acting by spring contact on the container.

U.S. Pat. No. 4,667,364 appears to disclose a floor cleaning machine which the fresh water and product dosing operation is controlled as a function of the operation of the driving motor such that the dosing per unit of floor area is maintained at an operator-controllable level. Improved economy of water, product and energy is achieved.

U.S. Pat. No. 4,580,313 appears to disclose a walk behind floor maintenance machine that includes a filter and filter housing that may be pivoted away to permit removal of the debris hopper. The filter may be cleaned by vibrating the filter and filter housing. Dust vibrated from the filter slides into the hopper. The hopper may be manually removed for emptying.

European Patent Number 2,628,427 A2 appears to disclose a device which has a suction motor and a dust collecting chamber arranged in a suction housing. A suction device-communication unit communicates with external communication units that form a component of a hand-held power tool. The external communication units are operated at a distance to the housing in connection with the tool. The suction device-communication unit includes a suction device transmitter for transmitting a control signal and/or a status signal to the external communication units. An independent claim is also included for an external communication unit for cooperation with a hand-held power tool.

While the above-identified patents and/or publications do appear to disclose various floor cleaning machines and associated systems, their configurations remain non-desirous, incompatible, and/or problematic inasmuch as, among other things, none of the above-identified floor cleaning machines and associated systems appear to include assemblies having intelligent systems that have the capacity to selectively gather, obtain, monitor, store, record, and analyze data associated with components of the floor cleaning machines and controllably communicate and disseminate such data with other systems and users. Furthermore, none of the above-identified floor cleaning machines and associated systems appear to utilize and/or be compatible with intelligent systems associated with secondary electrochemical cell sub-assemblies.

It is therefore an object of the present invention to provide floor cleaning machines having intelligent systems that have the capacity to selectively gather, obtain, monitor, store, record, and analyze data associated with components of the floor cleaning machines and controllably communicate and disseminate such data with other systems and users, as well as provide floor cleaning machines that are compatible with secondary electrochemical cells having intelligent systems associated therewith.

These and other objects of the present invention will become apparent in light of the present specification, claims, and appended drawings.

BRIEF DESCRIPTION OF THE DRAWINGS

Certain embodiments of the present invention are illustrated by the accompanying figures. It will be understood that the figures are not necessarily to scale and that details not necessary for an understanding of the invention or that render other details difficult to perceive may be omitted. It will be further understood that the invention is not necessarily limited to the particular embodiments illustrated herein.

The invention will now be described with reference to the drawings wherein:

FIG. 13A of the drawings is a wiring diagram of a floor cleaning machine fabricated in accordance with the present invention using a frame and wheel subassembly;

FIG. 13B of the drawings is a wiring diagram of another floor cleaning machine fabricated in accordance with the present invention using a frame and transaxle sub-assembly;

SUMMARY OF THE INVENTION

Figure 1:
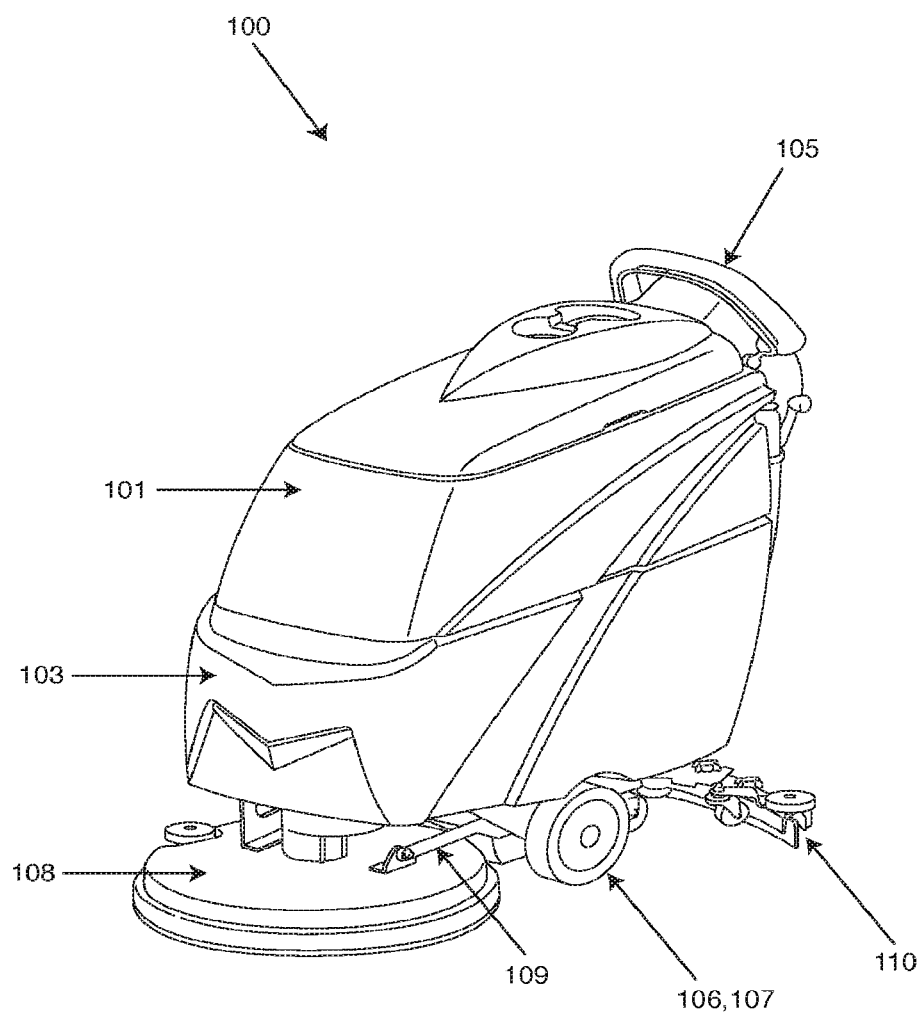
FIG. 1 of the drawings is a front perspective view of a floor cleaning machine fabricated in accordance with the present invention.

The present invention is directed to, in one embodiment, a floor cleaning machine having an intelligent system comprising, consisting essentially of, and/or consisting of: (1) a recovery tank sub-assembly; (2) a vacuum fan sub-assembly; (3) a solution tank sub-assembly, wherein the solution tank sub-assembly preferably comprises a secondary electrochemical cell; (4) a solution flow sub-assembly; (5) a control console sub-assembly; (6) at least one of a frame and wheel sub-assembly and a frame and transaxle sub-assembly; (7) a scrub head sub-assembly; (8) a scrub head lift sub-assembly; (9) a squeegee sub-assembly; and (10) an intelligent system associated with at least one of the above-identified sub-assemblies, wherein the intelligent system at least one of selectively gathers, obtains, monitors, stores, records, and analyzes data associated with components of the floor cleaning machine assembly, and at least one of controllably communicates and disseminates such data with at least one of another system and user.

The present invention is also directed to, in one embodiment, a sub-assembly having an intelligent system for a floor cleaning machine, comprising, consisting essentially of, and/or consisting of: (1) a primary and/or secondary electrochemical cell; and (2) an intelligent system, wherein the intelligent system at least one of selectively gathers, obtains, monitors, stores, records, and analyzes data associated with components of the floor cleaning machine assembly, and at least one of controllably communicates and disseminates such data with at least one of another system and user.

The present invention is additionally directed to, in one embodiment, a method for using an intelligent system with a floor cleaning machine assembly comprising, consisting essentially of, and/or consisting of the steps of: (1) providing a floor cleaning machine assembly having an intelligent system; (2) selectively gathering, obtaining, monitoring, storing, recording, and/or analyzing data associated with components of the floor cleaning machine assembly; and (3) controllably communicating and/or disseminating data with at least one of another system and user.

DETAILED DESCRIPTION OF THE INVENTION

While this invention is susceptible of embodiment in many different forms, there is shown in the drawings and will be described herein in detail, one or more specific embodiments with the understanding that the present disclosure is to be considered as an exemplification of the principles of the invention and is not intended to limit the invention to the embodiments illustrated.

It will be understood that like or analogous elements and/or components, referred to herein, may be identified throughout the drawings with like reference characters.

It will be further understood that FIGS. 1-18 are merely representations and/or illustrations of floor cleaning machines and their associated sub-assemblies. As such, some of the components may be distorted from their actual scale for pictorial clarity and/or image enhancement.

Unless otherwise specified, the machines, sub-assemblies, components and/or parts provided herein below are commercially available from International Cleaning Equipment (ICE) (Guangdong, China) or a subsidiary thereof.

Figure 2:
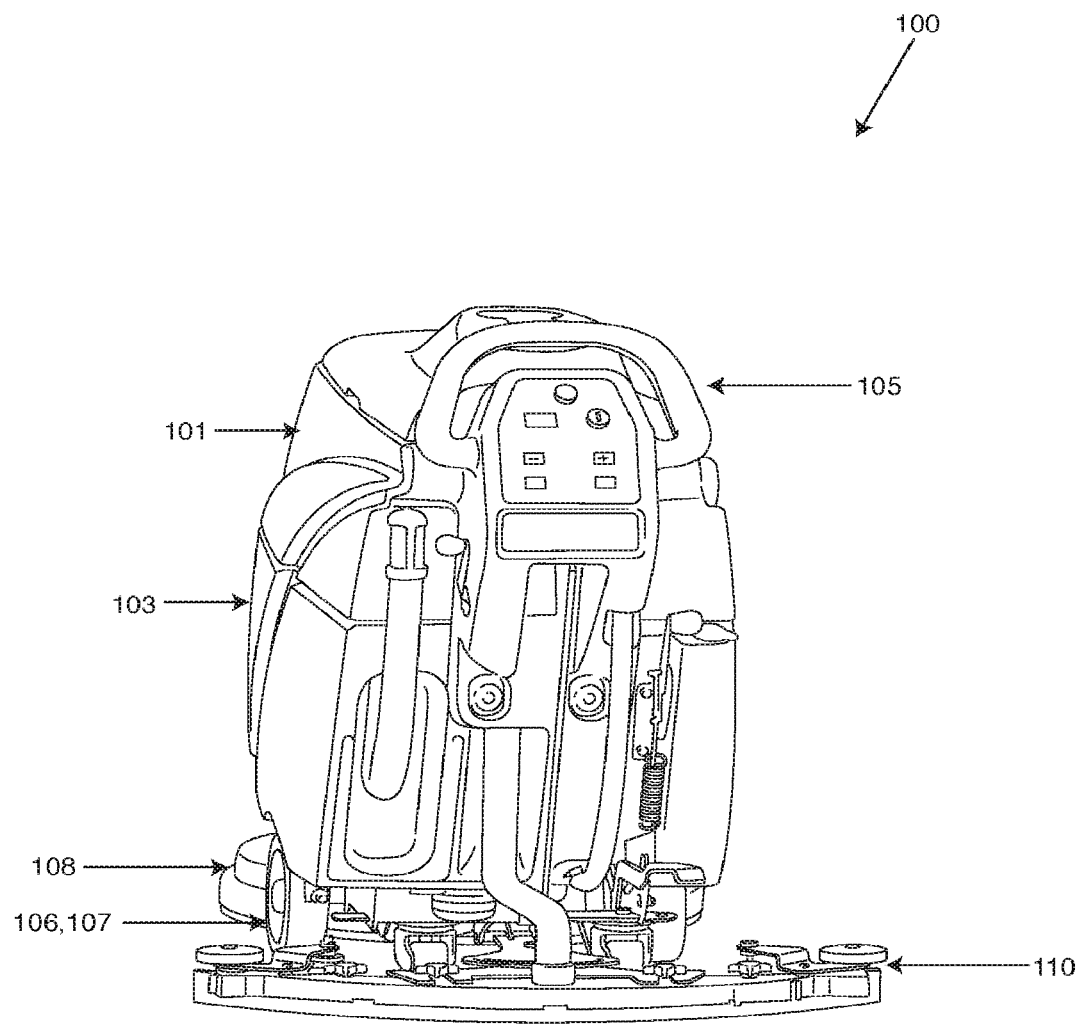
FIG. 2 of the drawings is a rear perspective view of a floor cleaning machine fabricated in accordance with the present invention.
Figure 3:
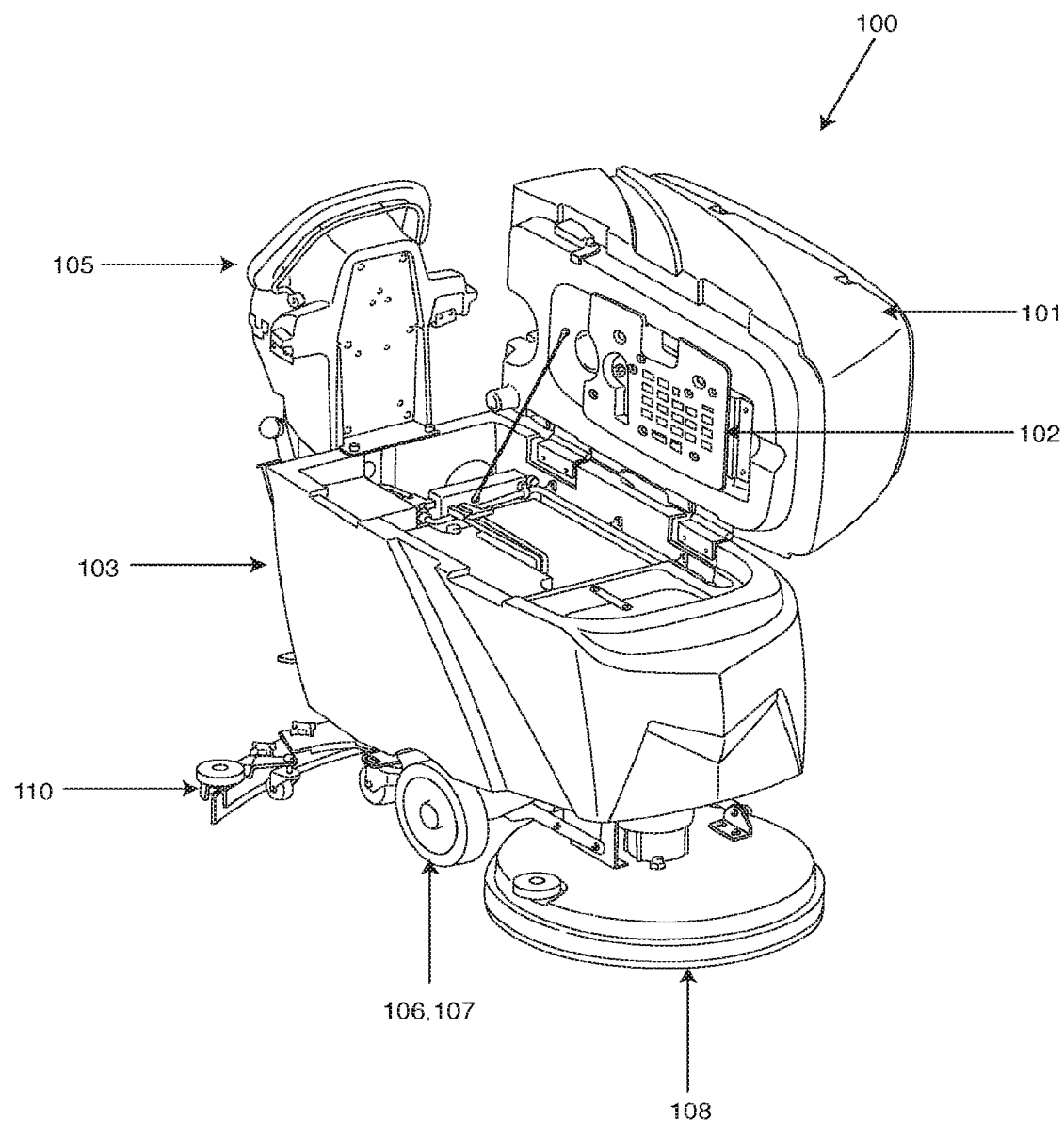
FIG. 3 of the drawings is a front perspective view of a floor cleaning machine fabricated in accordance with the present invention having an intelligent system integrated with a secondary electrochemical cell positioned within the solution tank sub-assembly.

Referring now to the drawings, and to FIGS. 1-3 in particular, perspective views of floor cleaning machine 100 having an intelligent system are shown. Preferably, floor cleaning machine 100 comprises recovery tank sub-assembly 101 (FIG. 4), vacuum fan sub-assembly 102 (FIG. 5), solution tank sub-assembly 103 (FIG. 6), solution flow sub-assembly 104 (FIG. 7), control console sub-assembly (FIG. 8), frame and wheel sub-assembly 106 (FIG. 9A) or frame and transaxle sub-assembly 107 (FIG. 9B), scrub head sub-assembly 108 (FIG. 10), scrub head lift sub-assembly 109 (FIG. 11), squeegee sub-assembly 110 (FIG. 12) and, as will be discussed in greater detail herein below, an intelligent system associated with one or more of the above-identified sub-assemblies, wherein the intelligent system selectively gathers, obtains, monitors, stores, records, and/or analyzes data associated with components of floor cleaning machine 100, and controllably communicates and/or disseminates such data with another system and/or user.

Figure 4:
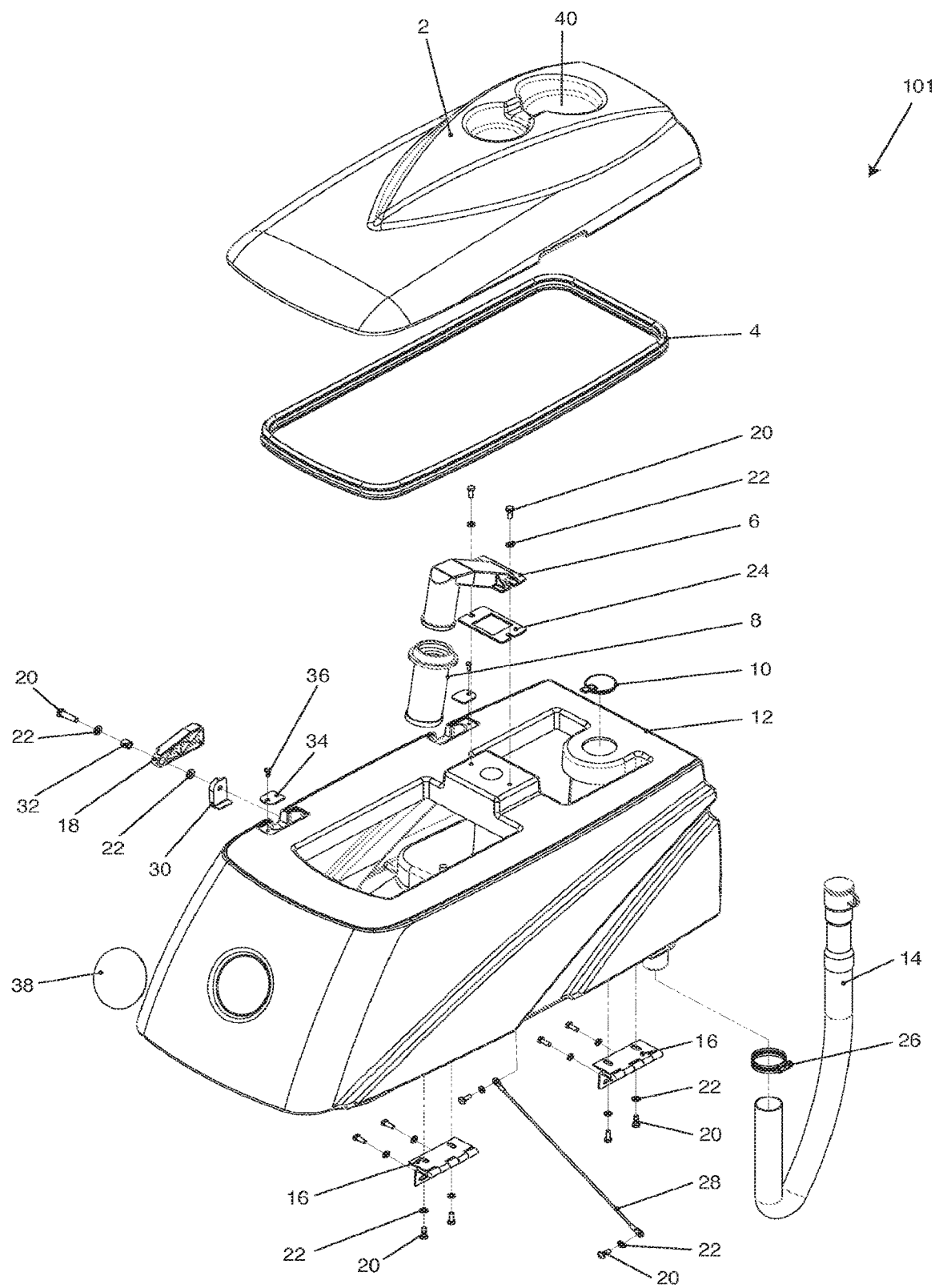
FIG. 4 of the drawings is an exploded isometric view of a recovery tank sub-assembly fabricated in accordance with the present invention.

Referring now to FIG. 4, in a preferred embodiment of the present invention, recovery tank sub-assembly 101 generally forms the upper portion of the body of floor cleaning machine 100. Recovery tank sub-assembly 101 preferably comprises recovery tank cover 2, recovery tank cover seal 4, float adapter 6, shut-off float 8, cap 10, recovery tank housing or body 12 for containing recovered solution, dirt, and/or debris, drain hose 14, hinge assembly 16 for releasable securement to solution tank sub-assembly 103, and recovery tank support 18.

As is also shown in FIG. 4, recovery tank sub-assembly 101 utilizes a plurality of conventional bolts 20, washers 22, gaskets 24, clamps 26, cables 28, brackets 30, sleeves 32, plates 34, and screws 36 for assembly and use of recovery tank sub-assembly 101.

Recovery tank sub-assembly 101 also preferably includes front indicia or logo 38 for product recognition and cup holder 40 for containing a cup, can, and/or bottle.

Figure 5:
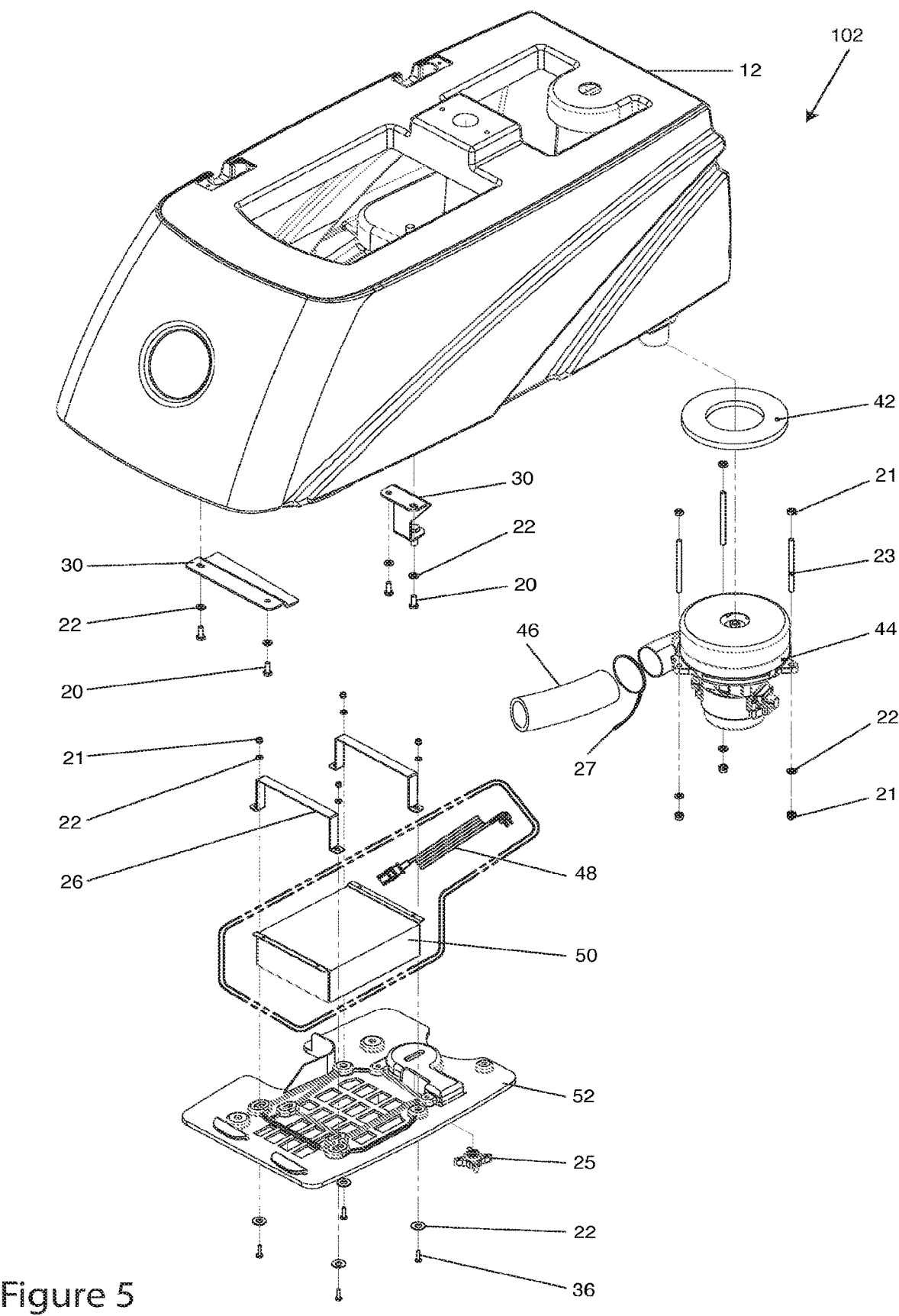
FIG. 5 of the drawings is an exploded isometric view of a vacuum fan sub-assembly fabricated in accordance with the present invention.

Referring now to FIG. 5, in a preferred embodiment of the present invention, vacuum fan sub-assembly 102 is positioned generally proximate the bottom portion of recovery tank sub-assembly 101. Vacuum fan sub-assembly 102 preferably comprises vacuum motor gasket 42, vacuum motor 44 (e.g., two-stage 24V DC 500 W), vacuum motor muffler 46, battery charger power cord 48, optional on-board battery charger 50, and charger cover 52.

As is also shown in FIG. 5, vacuum fan sub-assembly 102 utilizes a plurality of conventional bolts 20, nuts 21, washers 22, studs 23, knobs 25, clamps 26, ties 27 (e.g., nylon ties), brackets 30, and screws 36 for assembly and use of vacuum fan sub-assembly 102.

Figure 6:
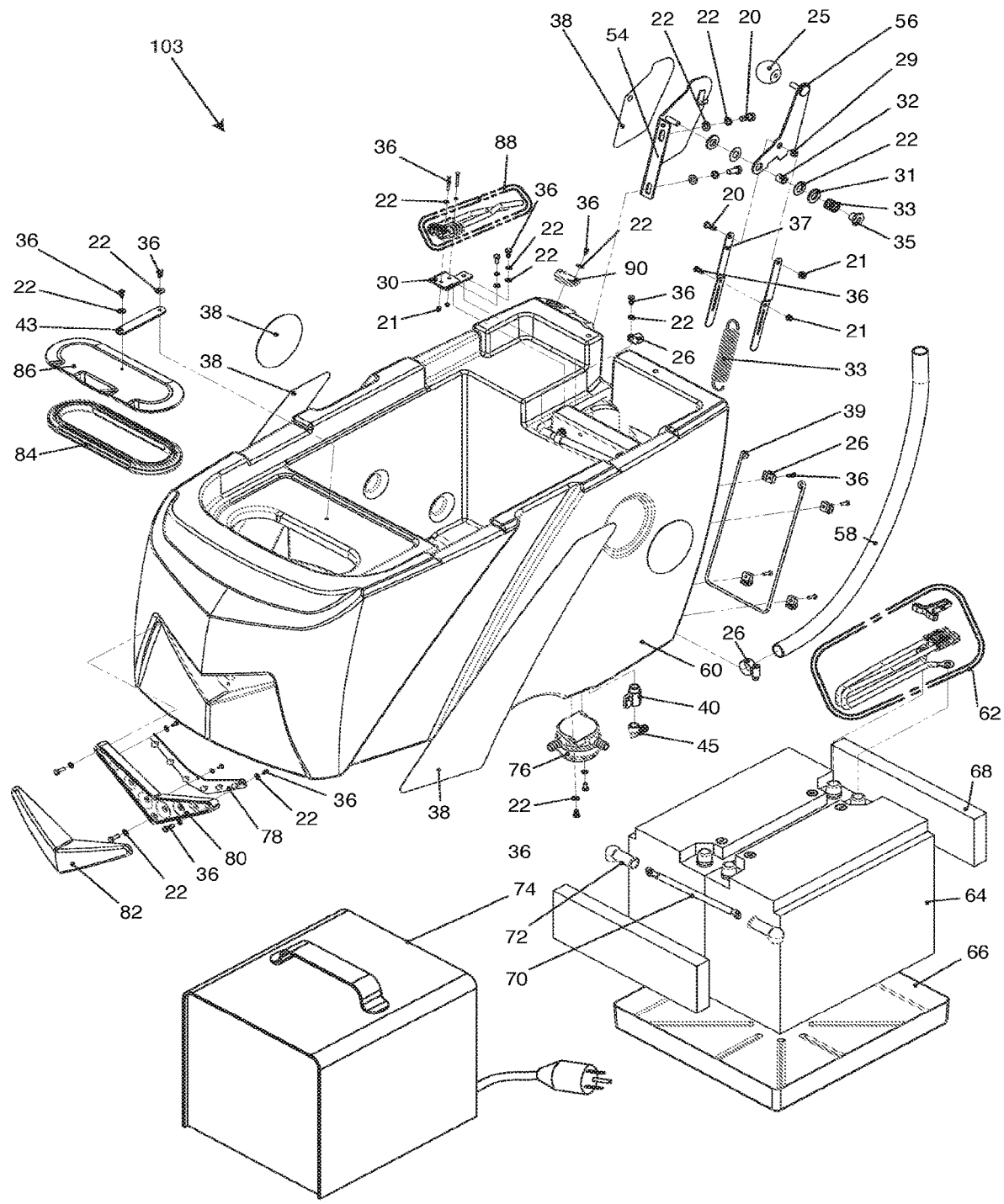
FIG. 6 of the drawings is an exploded isometric view of a solution tank sub-assembly fabricated in accordance with the present invention.

Referring now to FIG. 6, in a preferred embodiment of the present invention, solution tank sub-assembly 103 generally forms the lower portion of the body floor cleaning machine 100. Solution tank sub-assembly 103 preferably comprises down pressure lever bracket 54, down pressure lever 56, clean tubing 58, solution tank 60, battery connect cable assembly 62, battery 64, battery tray 66, battery spacers 68, battery connect cable 70, battery terminal cover 72, optional off-board battery charger 74, filter assembly 76, indicia/logo 38, LED light 78, LED light mounting base 80, LED light cover 82, seal member 84, cover member 86, battery connect cable assembly 88, and solution fill cap 90.

In accordance with the present invention, battery 64 preferably comprises a secondary electrochemical cell, such as a lead acid, NiCad, NiMH, and/or lithium-ion battery. Preferred examples of lithium-ion batteries include lithium cobalt oxide ($LiCoO_2$) batteries, lithium manganese oxide ($LiMn_2O_4$) batteries, lithium nickel manganese cobalt oxide ($LiNiMnCoO_2$) batteries, lithium iron phosphate (LiFePO) batteries, lithium nickel cobalt aluminum oxide ($LiNiCoAlO_2$) batteries, and lithium titanate ($Li_4Ti_5O_{12}$) batteries. In one embodiment each battery 64 comprises an anode, a cathode, and an electrolyte, wherein at least one of the anode, cathode, and electrolyte are monitored by the intelligent system of the floor cleaning machine's intelligent system. Such monitoring comprises evaluating the structural integrity of the anode, the cathode, and/or the electrolyte, and/or the cycle life of each component—including electrolyte level.

As is also shown in FIG. 6, solution tank sub-assembly 103 utilizes a plurality of conventional bolts 20, nuts 21, washers 22, clamps 26, bushings 29, plates/brackets 30, thrust bearings 31, sleeves 32, springs 33, spring retainers 35, screws 36, spring links 37, indicia/logos/labels 38, netting 39, ball valves 41, straps 43, and elbows 45 for assembly and use of solution tank sub-assembly 103.

Figure 7:
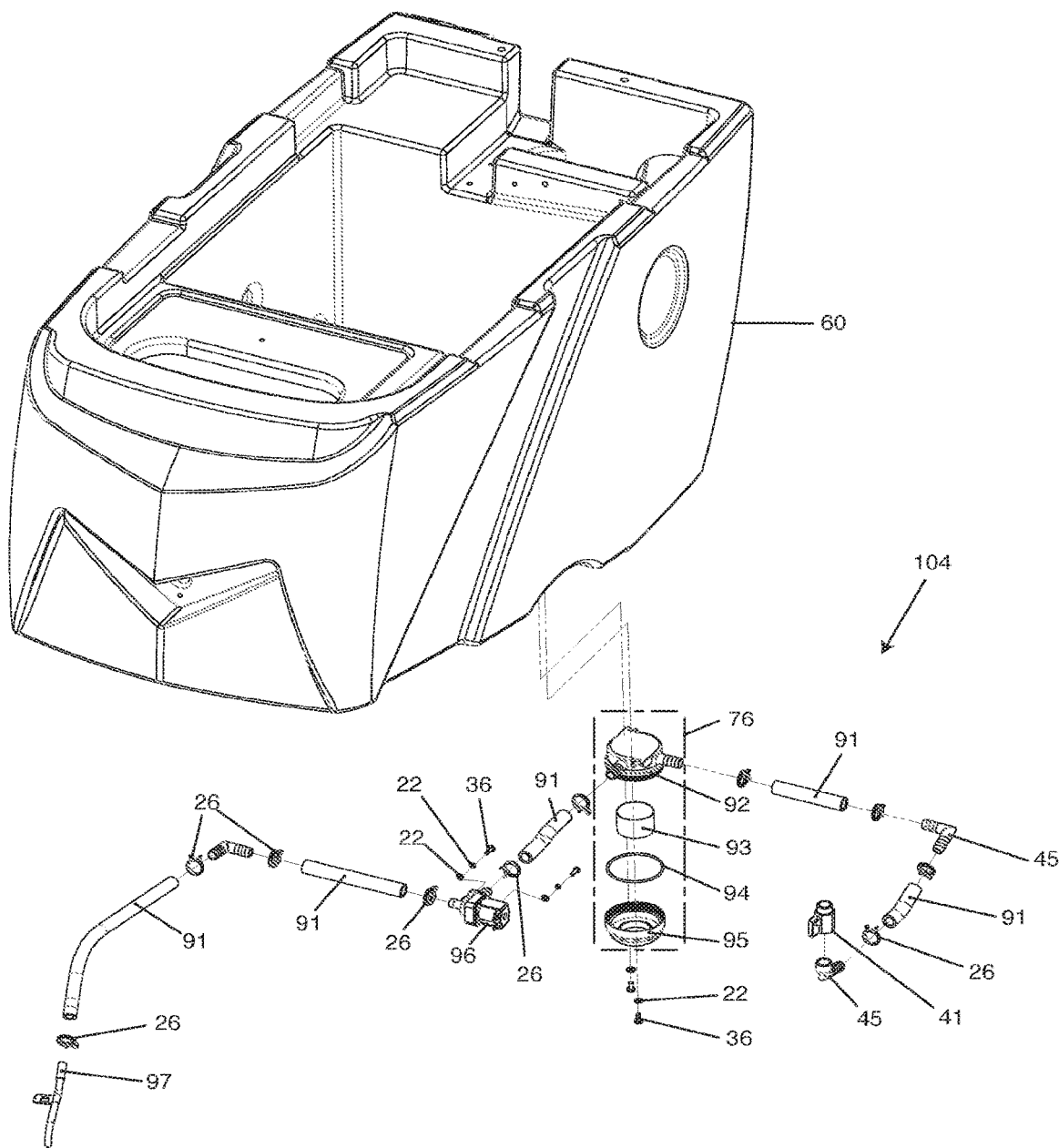
FIG. 7 of the drawings is an exploded isometric view of a solution flow sub-assembly fabricated in accordance with the present invention.

Referring now to FIG. 7, in a preferred embodiment of the present invention, solution flow sub-assembly 104 is positioned generally proximate the lower portion of solution tank sub-assembly 103. Solution flow sub-assembly 104 preferably comprises elbows 45, ball valve 41, clamps 26, tubing 91, filter assembly 76 from solution tank sub-assembly 103 (filter assembly 76 includes filter assembly base 92, filter screen 93, o-ring 94, and cap 95), washers 22, solenoid valve 96 (e.g., 24V DC), screws 36, and water supply tube 97.

Figure 8:
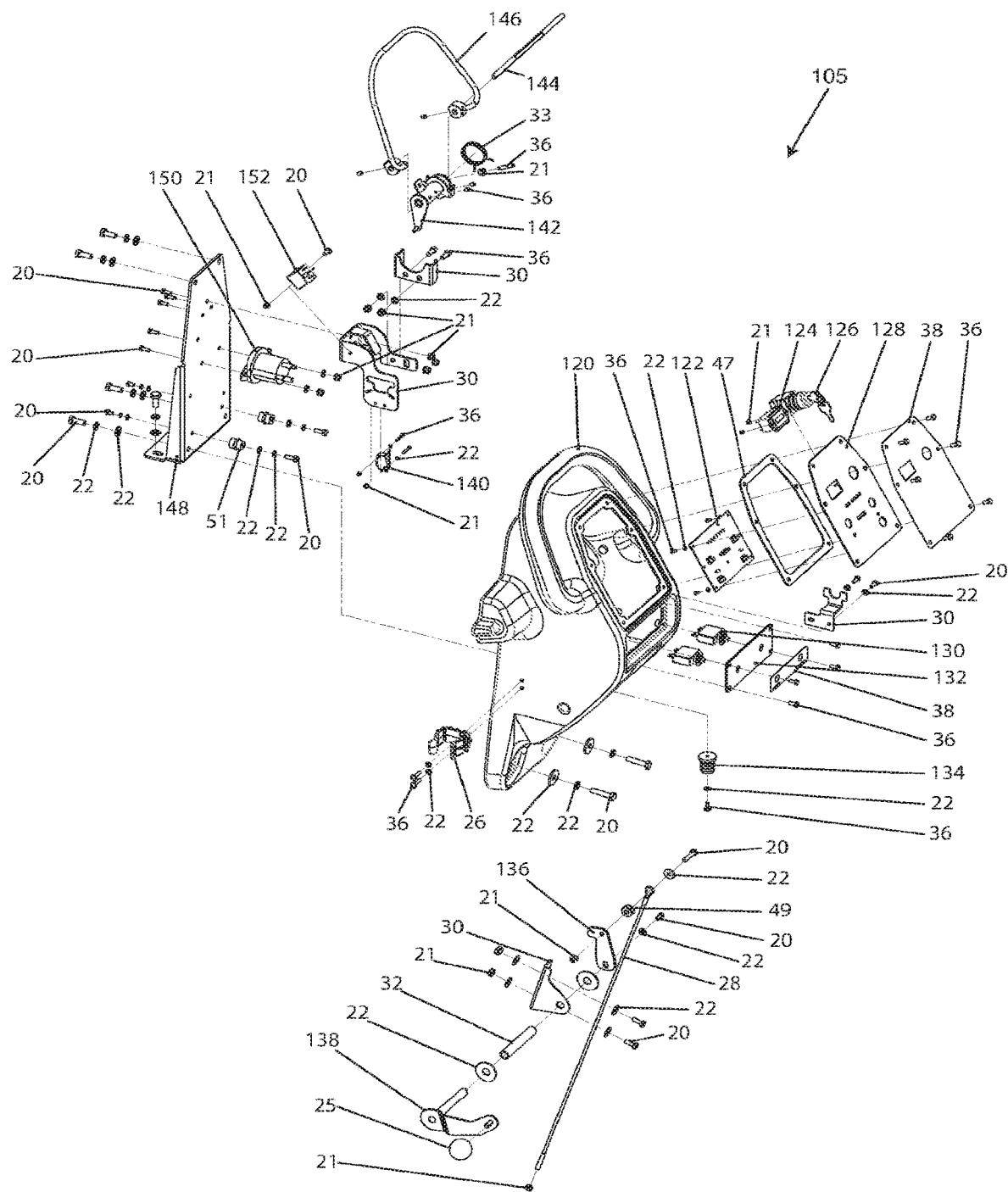
FIG. 8 of the drawings is an exploded isometric view of a control console sub-assembly fabricated in accordance with the present invention.

Referring now to FIG. 8, in a preferred embodiment of the present invention, control console sub-assembly 105 generally forms the back or rear portion of floor cleaning machine 100. Control console sub-assembly 105 preferably comprises control console housing 120, PCB assembly 122, timer 124, key switch 126, control panel 128, circuit breaker 130, circuit breaker mounting plate 132, connector 134, baffle 136, squeegee lifting handle 138, micro-switch 140, actuator 142, shaft 144, bail lever 146, control console rear plate 148, solenoid switch 150, and relay 152.

As is also shown in FIG. 8, control console sub-assembly 105 utilizes a plurality of conventional bolts 20, nuts 21, washers 22, knobs 25, clamps 26, cables 28, brackets 30, sleeves 32, springs 33, plates 34, screws 36, indicia/logos/labels 38, gaskets 47, spacers 49, and stand-offs 51 for assembly and use of control console sub-assembly 105.

Figure 9A:
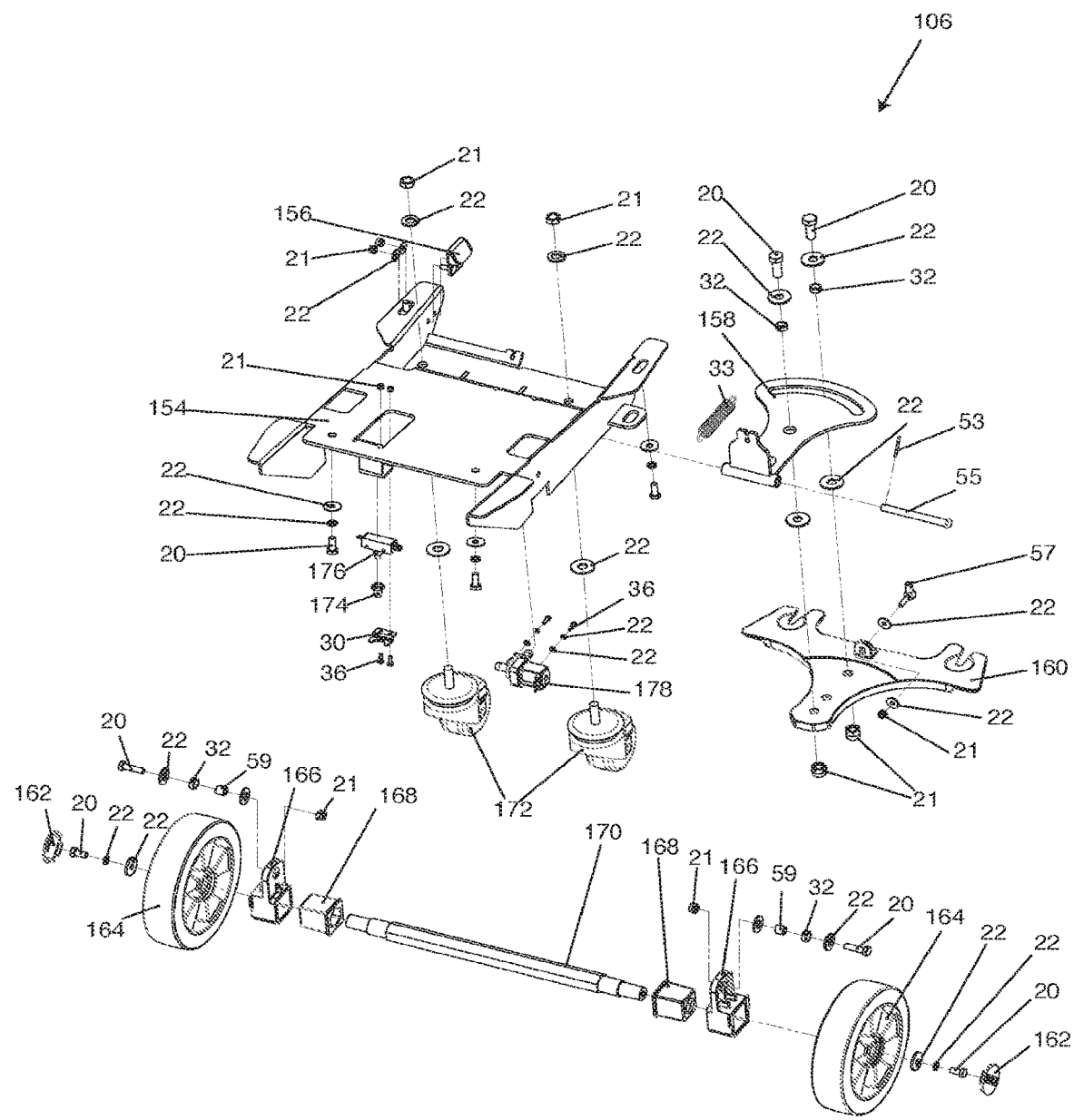
FIG. 9A of the drawings is an exploded isometric view of a frame and wheel sub-assembly fabricated in accordance with the present invention.

Referring now to FIG. 9A, in a preferred embodiment of the present invention, frame and wheel sub-assembly 106 (i.e., non-motor driven) generally comprises main frame 154, pedal locking bracket 156, squeegee lift bracket 158, squeegee mounting bracket 160, wheel cover 162, wheel 164, axle mounting adapter 166, axle grommet 168, wheel axle 170, caster 172, micro switch cap 174, micro switch 176, and solenoid valve 178 (e.g., 24V DC).

As is also shown in FIG. 9A, frame and wheel sub-assembly 106 utilizes a plurality of conventional bolts 20, nuts 21, washers 22, brackets 30, sleeves 32, springs 33, plates 34, screws 36, cotters 53, pins 55, ball joints 57, journal bearing 59 for assembly and use of control frame and wheel sub-assembly 106.

Figure 9B:
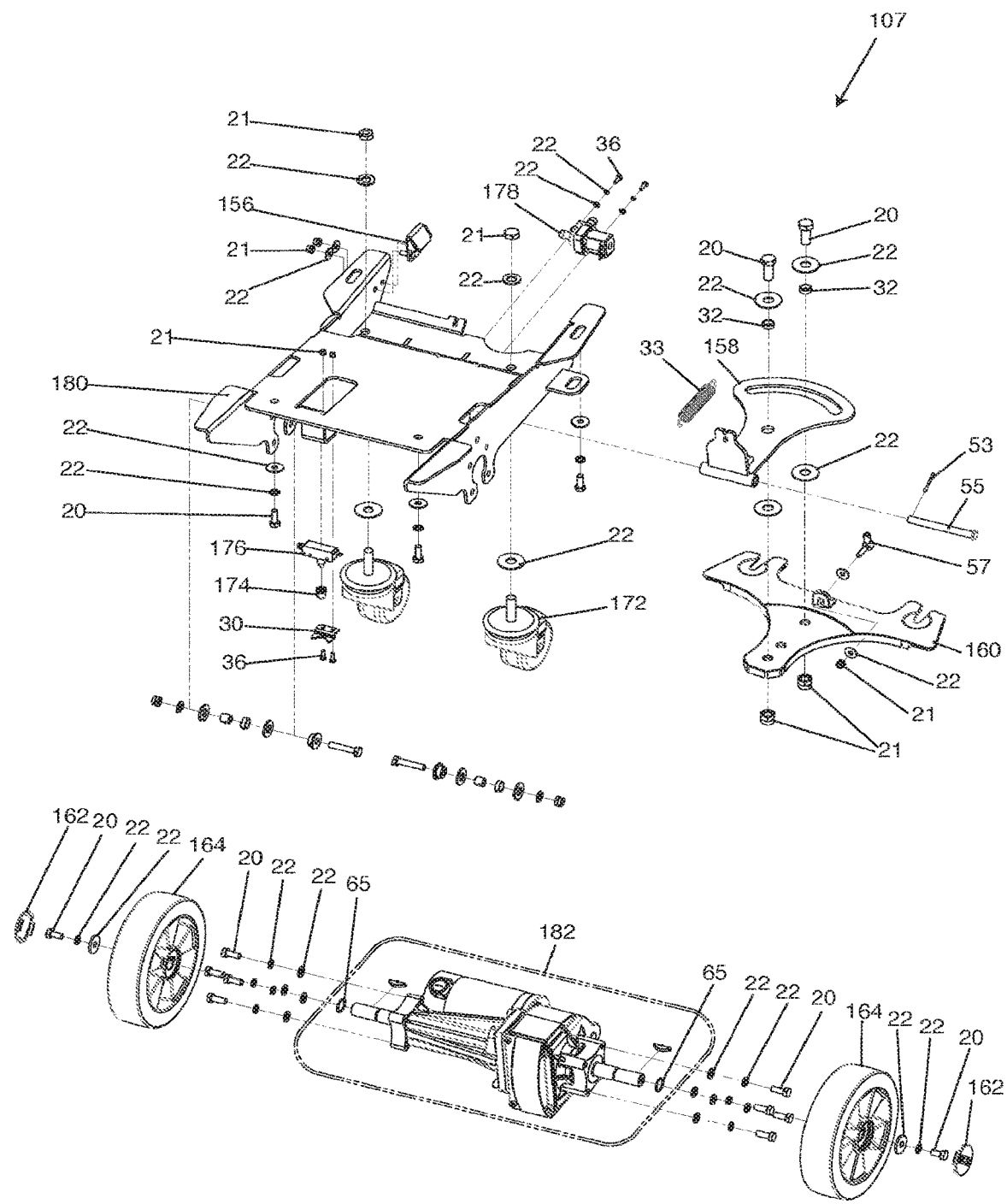
FIG. 9B of the drawings is an exploded isometric view of a frame and transaxle sub-assembly fabricated in accordance with the present invention.

Referring now to FIG. 9B, in a preferred embodiment of the present invention, frame and transaxle sub-assembly 107 (i.e., motor driven) generally comprises the same components as frame and wheel sub-assembly 106 (FIG. 9A) except for retaining ring 65, main frame 180 and motor/transaxle 182.

Figure 10:
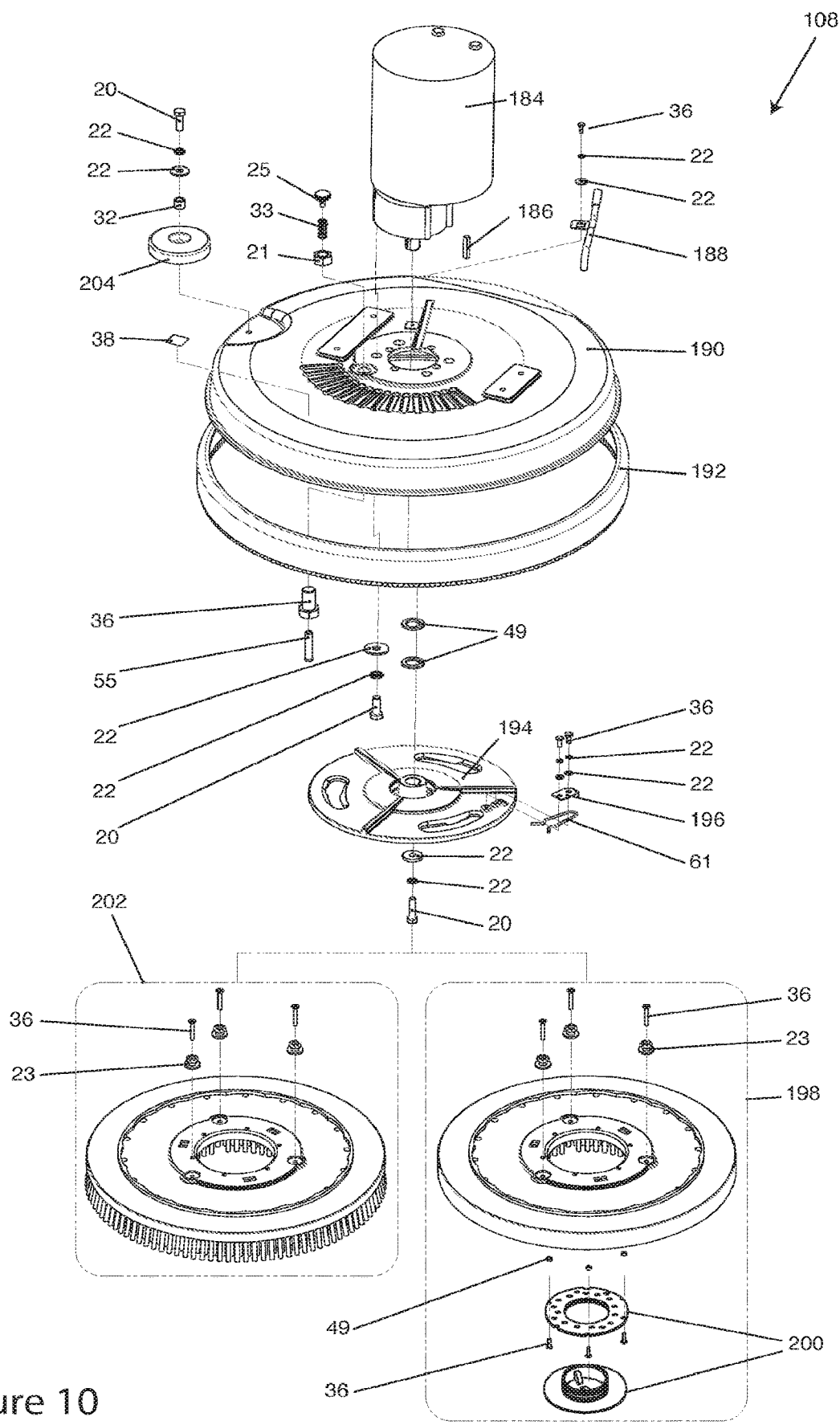
FIG. 10 of the drawings is an exploded isometric view of a scrub head sub-assembly fabricated in accordance with the present invention.

Referring now to FIG. 10, in a preferred embodiment of the present invention, scrub head sub-assembly 108 generally comprises brush motor 184 (e.g., 24V DC 1.0 hp), key 186, water supply tube 188, scrub head housing 190, scrub head bumper 192, drive hub 194, brush clamp plate 196, pad driver 198, big mouth 200, brush 202, and protective wheel 204.

As is also shown in FIG. 10, scrub head sub-assembly 108 utilizes a plurality of conventional bolts 20, nuts 21, washers 22, studs 23, knobs 25, sleeves 32, springs 33, screws 36, indicia/labels 38, spacers 49, pins 55, and spring clips 61 for assembly and use of control frame and wheel sub-assembly 106.

Figure 11:
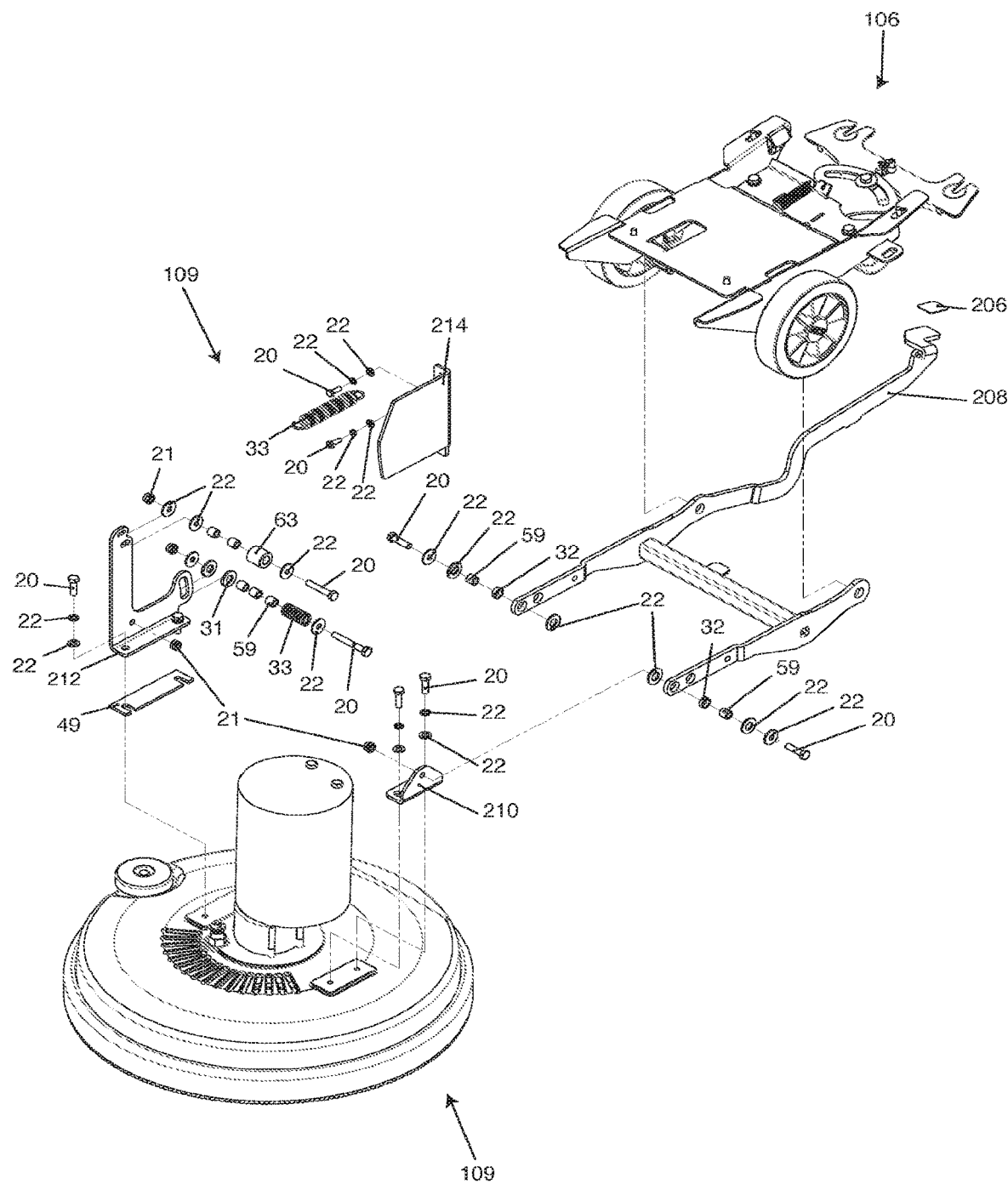
FIG. 11 of the drawings is an exploded isometric view of a scrub head lift sub-assembly fabricated in accordance with the present invention.

Referring now to FIG. 11, in a preferred embodiment of the present invention, scrub head lift sub-assembly 109 generally comprises non-slip mat 206, scrub head lift bracket 208, left bracket 210, right bracket 212, and guide bracket 214.

As is also shown in FIG. 11, scrub head lift sub-assembly 109 utilizes a plurality of conventional bolts 20, nuts 21, washers 22, brackets 30, springs 33, plates 34, screws 36, journal bearing 59, and roller 63 for assembly and use of control frame and wheel sub-assembly 106.

Figure 12:
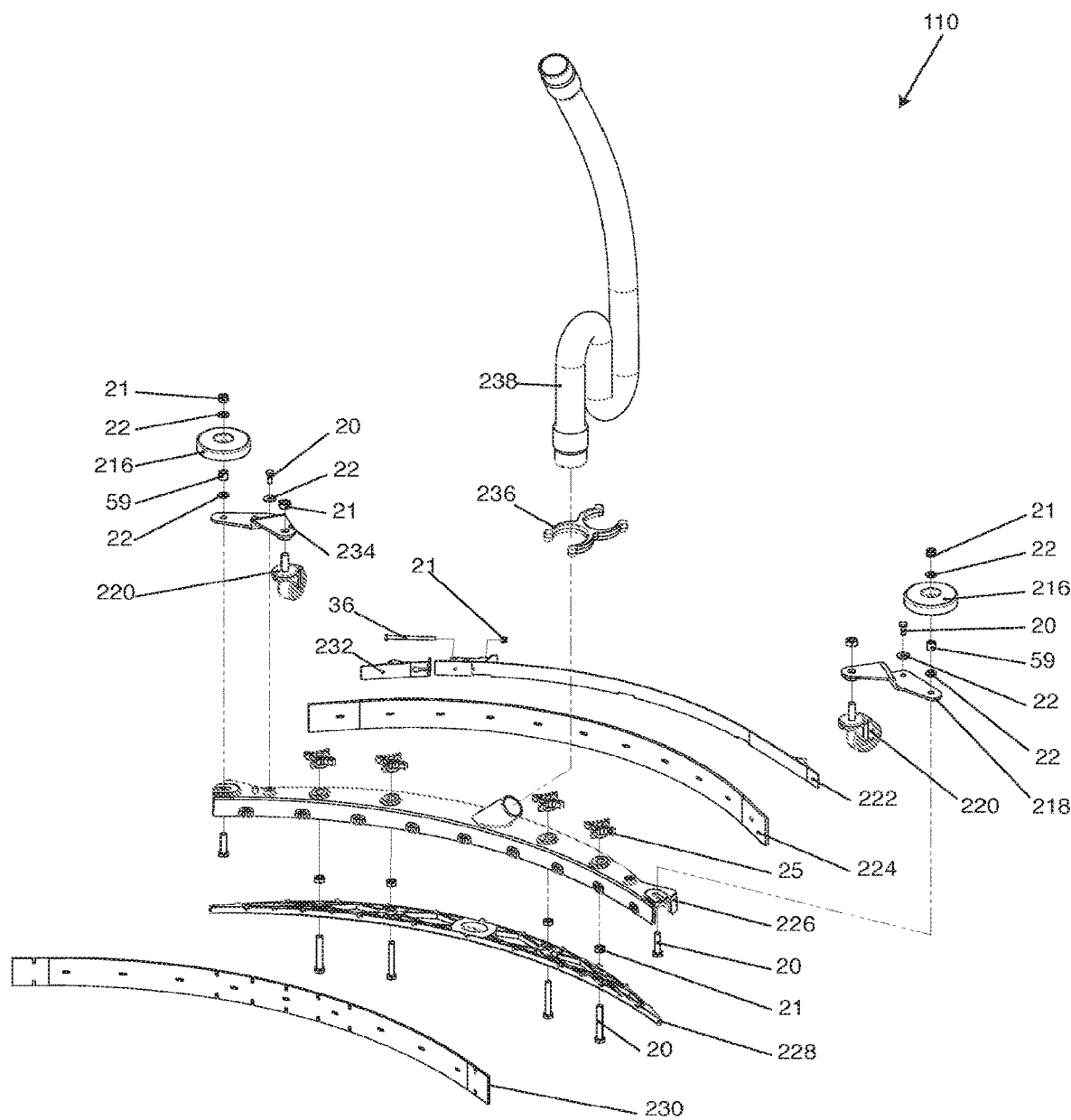
FIG. 12 of the drawings is an exploded isometric view of a squeegee sub-assembly fabricated in accordance with the present invention.

Referring now to FIG. 12, in a preferred embodiment of the present invention, squeegee sub-assembly 110 generally comprises protective wheel 216, right bracket 218, caster 220, squeegee clamp assembly 222, rear squeegee blade 224, squeegee housing 226, squeegee retainer 228, front squeegee blade 230, short clamp assembly 232, left bracket 234, vacuum hose holder 236, and vacuum hose 238.

As is also shown in FIG. 12, squeegee sub-assembly 110 utilizes a plurality of conventional bolts 20, nuts 21, washers 22, knobs 25, screws 36, and journal bearings 59 for assembly and use of squeegee sub-assembly 110.

Referring now to FIGS. 13A-B, wiring diagrams for floor cleaning machine 100 are provided. FIG. 13A discloses a floor cleaning machine having frame and wheel sub-assembly 106. FIG. 13B of the drawings discloses a floor cleaning machine having frame and transaxle sub-assembly 107.

In another embodiment of the present invention, a sub-assembly having an intelligent system for a floor cleaning machine is provided and generally comprises a primary and/or secondary electrochemical cell, and an intelligent system, wherein the intelligent system at least one of selectively gathers, obtains, monitors, stores, records, and analyzes data associated with components of the floor cleaning machine assembly, and at least one of controllably communicates and disseminates such data with at least one of another system and user.

In accordance with the present invention, a method for using an intelligent system with a floor cleaning machine assembly is provided and generally, comprises the following steps: (1) providing a floor cleaning machine assembly having an intelligent system; (2) selectively gathering, obtaining, monitoring, storing, recording, and/or analyzing data associated with components of the floor cleaning machine assembly; and (3) controllably communicating and/or disseminating data with at least one of another system and user. In particular and as is collectively shown in FIGS. 1-18, an intelligent system enables a floor cleaning machine assembly to transmit data obtained from the floor cleaning machine assembly to, for example, a storage or data server, which, in turn, transmits selected data to, for example, an end user via email and/or text messaging.

Figure 14:
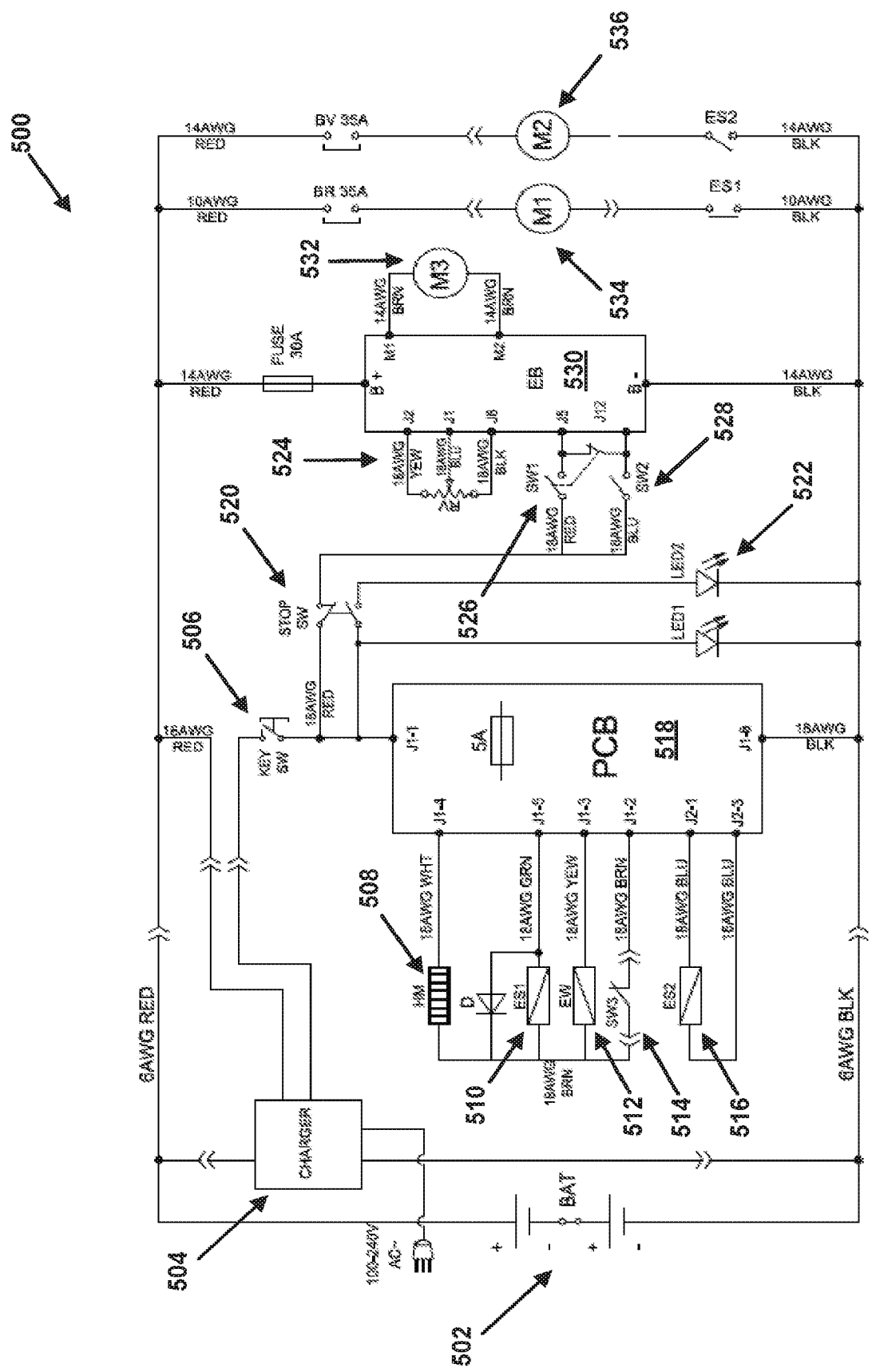
FIG. 14 of the drawings is a schematic of a circuit diagram of a floor cleaning machine fabricated in accordance with the present invention.

FIG. 14 is a schematic diagram of an example circuit diagram 500 of a floor cleaning machine assembly of the present technology. Generally, the circuit diagram 500 includes a battery interface 502, a charger interface 504, a main power key switch 506, an hour meter 508, a brush motor solenoid switch 510, a solution solenoid valve switch 512, safety switch 514, a vacuum motor relay 516, a printed circuit board (PCB) 518 (e.g., controller), an emergency stop switch 520, a pair of LED interfaces 522, a speed potentiometer 524, a forward control handle bail switch 526, a backward control handle bail switch 528, a speed control board 530, a transaxle motor interface 532, a brush motor interface 534, and a vacuum motor interface 536.

The PCB 518 (e.g., controller) functions as a main controller board for controlling and communicating with various components of the floor cleaning machine assembly. In some embodiments, the PCB 518 can include one or more features of an example computing machine illustrated and described with respect to FIG. 18. The PCB 518 includes at least a processor and a memory for storing executable instructions. The processor can execute the instructions to provide any of the data sensing, gathering, processing, transforming, and/or communication features described herein.

It will be understood that the PCB 518 can be referred to generally as an intelligent system or component that is configured to provide data gathering, recording, logging, transmitting, and analysis functionalities. In other embodiments, an intelligent system can include the PCB 518 that cooperates with a management server, where the PCB 518 gathers and collects operational data for the floor cleaning machine assembly and the management server performs data analysis functionalities on the operational data. In yet other embodiments, an intelligent system can include the PCB 518 that is configured to remotely activate/deactivate (e.g., turn on and off) floor cleaning machine 100 via, for example power key switch 506 or other circuit implantation.

Generally, the PCB 518 is communicatively coupled to each of the other components of the circuit described above, either directly or indirectly. For example, the PCB 518 directly communicates with the batteries of the floor cleaning machine assembly, through the battery interface 502, while the PCB 518 indirectly couples with the transaxle motor interface 532 through the speed control board 530.

The battery interface 502 allows for the PCB 518 to communicate with the Ion batteries to receive feedback including charge level, average usage and current draw, as well as other battery related metrics.

The charger interface 504 allows the PCB 518 to determine charging metrics such as average charging times.

The main power key switch 506 is controlled by the PCB 518 to allow the floor cleaning machine assembly to be turned on and off. Key metrics around the main power key switch 506 can include start and stop times. The PCB 518 can time stamp each operation such as device on and device off instances and record these metrics for statistical or reporting purposes. Other statistics could include time duration between device on and device off operations, which indicate duration of usage for the floor cleaning machine assembly.

The hour meter switch 508 is controlled by the PCB 518 to calculate hours of operation for the floor cleaning machine assembly, in some embodiments.

The brush motor solenoid switch 510 can be controlled by the PCB 518 to selectively control engagement or disengagement of the brush motor 184 of the floor cleaning machine assembly. The PCB 518 can track brush motor usage time by measuring engagement and disengagement of the brush motor 184. These statistics can be compared against device on and device off periods to determine how long the brush is engaged compared to the overall time frame of device on periods. By way of example, the PCB 518 can measure that the device is in a device on state for two hours, but the brush motor was only in use for 15 minutes.

The solution solenoid valve switch 512 can be utilized to control dispensing of solution through a solution dispenser. The PCB 518 can track solution dispensing events, which can be used to calculate metrics around solution utilization.

The safety switch 514 can be controlled with the PCB 518, for example, to lift a scrub head from contact with the floor. In some embodiments, when the PCB 518 activates the safety switch 514, the brush motor solenoid switch 510 can be controlled to disengage the brush motor 184. Other safety related operations can also likewise be accomplished using the safety switch 514.

The vacuum motor relay 516 can be utilized by the PCB 518 to control operation of the vacuum motor 44 of the floor cleaning machine assembly.

The emergency control switch 520 is controlled by the PCB 518 to control operation of an emergency switch of the floor cleaning machine assembly. A user can stop operation of the floor cleaning machine assembly by actuating the emergency switch. Actuation of the emergency switch is sensed by the PCB 518, causing the PCB 518 to selectively stop the brush motor 184 and the transaxle 182.

In one embodiment, the emergency control switch 520 can be used to selectively disrupt power provided to the speed control board 530. That is, the speed control board 530 is configured to control operation of the transaxle motor, by way of the transaxle motor interface 532.

A pair of LED interfaces 522 can be used by the PCB 518 to selectively control operation of LED lights that indicate operational statuses of the device 100, such as forward, backward, power on, and so forth.

The speed potentiometer 524 is controlled by the speed control board 530 to sense input from a user that can be used to vary the speed of the device. For example, the speed potentiometer 524 can receive a speed indication from a user. The speed indication is received by the PCB 518 from input into the speed potentiometer 524. This input is then translated into rotational speed of the transaxle motor through the transaxle motor interface 532.

The forward control handle bail switch 526 provides forward movement of the floor cleaning machine assembly. In some embodiments, the speed control board 504 utilizes the backward control handle bail switch 528 to provide backward movement of the floor cleaning machine assembly.

In response to signals through the forward control handle bail switch 526 and/or signals through the backward control handle bail switch 528, the transaxle motor interface 532 can be used by the speed control board 530 to selectively control the operation of the transaxle motor. For example, the speed control board 530 can selectively control the forward and/or backward rotation of the transaxle motor.

Figure 18:
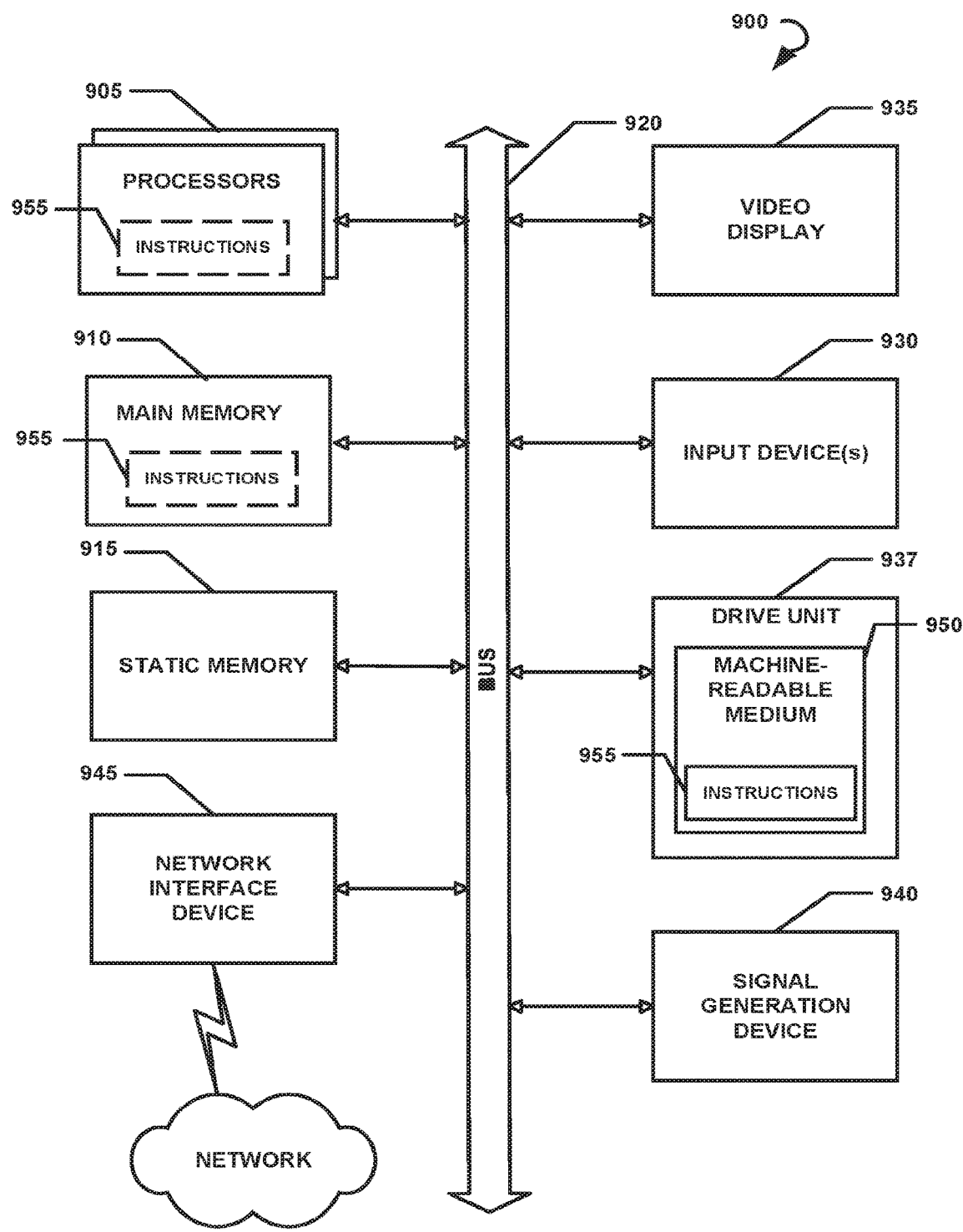
FIG. 18 of the drawings is a diagrammatic representation of a machine in the form of a computer system.

As with the PCB 518, the speed control board 530 can include one or more of the components of the computing machine of FIG. 18, such as a processor and memory. To be sure, the memory is configured with executable instructions that allow the processor to perform any of the functional or process related steps described herein.

Additionally, the PCB 518 can be configured to sense and collect the operational information of the speed control board 530 as the speed control board 530 controls the transaxle motor interface 532. For example, the PCB 518 can determine operational speeds for the transaxle motor, usage times, and so forth.

The PCB 518 can also control the brush motor 184 and vacuum motor 44, through their respective interfaces, such as brush motor interface 534 and vacuum motor interface 536. As with other components, the PCB 518 can be configured to sense and collect operational details of these devices.

Figure 15:
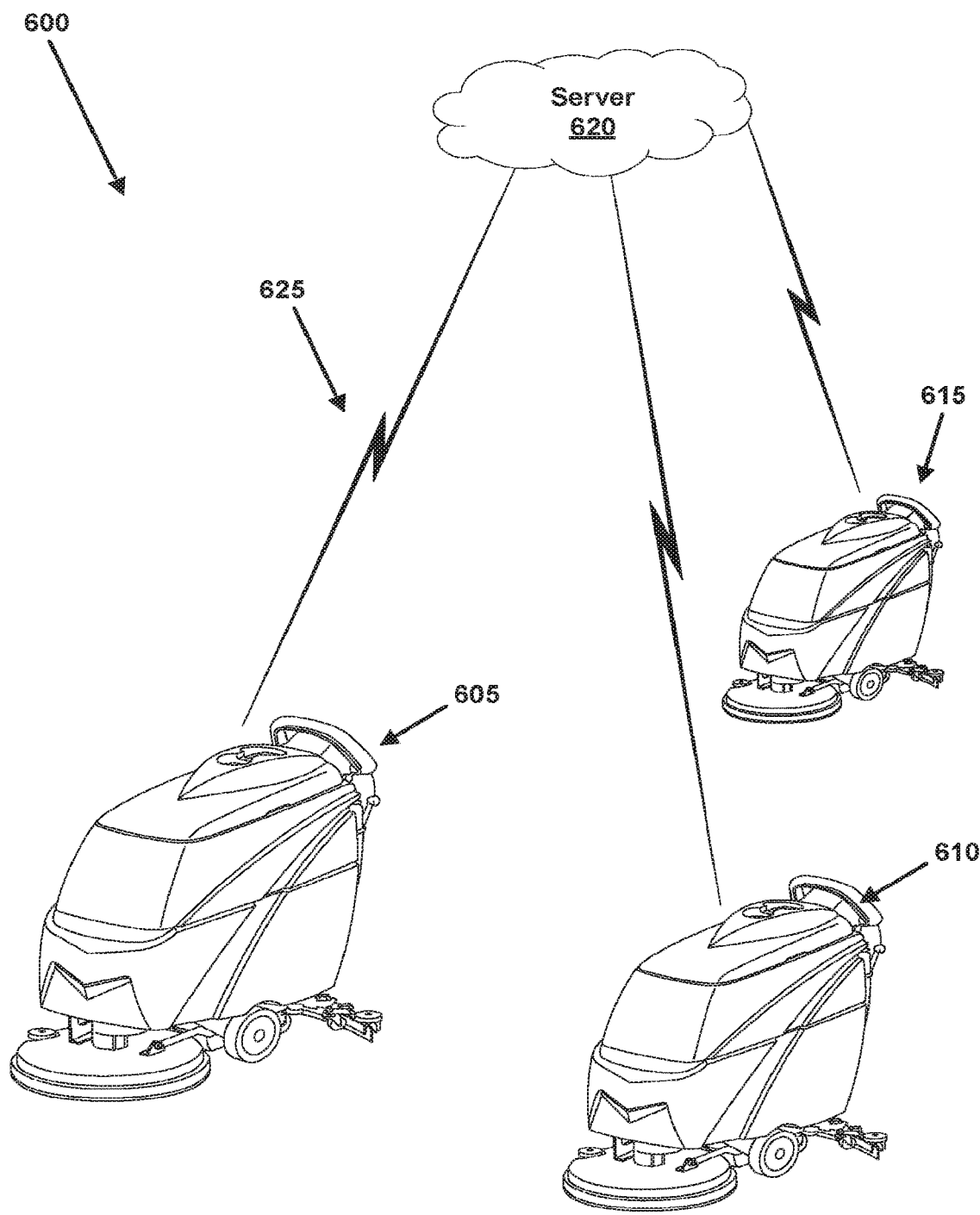
FIG. 15 of the drawings is an illustrative example of a network system of floor cleaning machines.

In some embodiments, the PCB 518 communicates within an intelligent system 600, illustrated in greater detail in FIG. 15. The PCB 518 can include any wired or wireless means of communication such as a wireless communications interface. The wireless communications interface can utilize any protocol for network communication including short range protocols such as Bluetooth, near field communications (NFC), infra-red, and so forth. The wireless communications interface can also include utilize Wi-Fi, a cellular network, or other similar networks using other protocols.

FIG. 15 illustrates an example network system of devices. The networked system 600 comprises a plurality of devices 605, 610, and 615, which can all communicatively couple with a management server 620 over a network 625.

Each of the plurality of devices 605-615 can be collocated in the same facility, such as a building, factory, school, or other location. In other embodiments, one or more (or all) plurality of devices 605-615 can be remotely located from one another.

Each of the plurality of devices 605-615 can gather and report its operational metrics to the management server 620 over the network 625, as will be discussed in greater detail below.

Exemplary networks, such as network 625 may include any one or more of, for instance, a local intranet, a PAN (Personal Area Network), a LAN (Local Area Network), a WAN (Wide Area Network), a MAN (Metropolitan Area Network), a virtual private network (VPN), a storage area network (SAN), a frame relay connection, an Advanced Intelligent Network (AIN) connection, a synchronous optical network (SONET) connection, a digital T1, T3, E1 or E3 line, Digital Data Service (DDS) connection, DSL (Digital Subscriber Line) connection, an Ethernet connection, an ISDN (Integrated Services Digital Network) line, a dial-up port such as a V.90, V.34 or V.34bis analog modem connection, a cable modem, an ATM (Asynchronous Transfer Mode) connection, or an FDDI (Fiber Distributed Data Interface) or CDDI (Copper Distributed Data Interface) connection. Furthermore, communications may also include links to any of a variety of wireless networks, including 4GLTE (Long Term Evolution), 3GPP (3G Radio Access Network), WAP (Wireless Application Protocol), GPRS (General Packet Radio Service), GSM (Global System for Mobile Communication), CDMA (Code Division Multiple Access) or TDMA (Time Division Multiple Access), cellular phone networks, GPS (Global Positioning System), CDPD (cellular digital packet data), RIM (Research in Motion, Limited) duplex paging network, Bluetooth radio, or an IEEE 802.11-based radio frequency network. The network 620 can further include or interface with any one or more of an RS-232 serial connection, an IEEE-1394 (Fire wire) connection, a Fiber Channel connection, an IrDA (infrared) port, a SCSI (Small Computer Systems Interface) connection, a USB (Universal Serial Bus) connection or other wired or wireless, digital or analog interface or connection, mesh or Digi® networking.

The management server 620 is preferably implemented in a cloud-computing environment. In general, a cloud-based computing environment is a resource that typically combines the computational power of a large grouping of processors and/or that combines the storage capacity of a large grouping of computer memories or storage devices. For example, systems that provide a cloud resource may be utilized exclusively by their owners, such as Google™ or Yahoo!™ or such systems may be accessible to outside users who deploy applications within the computing infrastructure to obtain the benefit of large computational or storage resources. The cloud may be formed, for example, by a network of web servers, with each web server (or at least a plurality thereof) providing processor and/or storage resources. These servers may manage workloads provided by multiple users (e.g., cloud resource customers or other users). Typically, each user places workload demands upon the cloud that vary in real-time, sometimes dramatically. The nature and extent of these variations typically depend on the type of business associated with the user.

In operation, each of the plurality of devices 605-615 can communicate with the management server 620, with each of the plurality of devices 605-615 acting as a node within the network. The management server 620 can track metrics about each of the plurality of devices 605-615 by communicating with the PCB on each of the plurality of devices 605-615.

In some embodiments, data obtained by the PCB of each of the plurality of devices 605-615 is selectively gathered, obtained, monitored, stored, recorded, and/or analyzed by the management system 620.

According to some embodiments, data that is selectively gathered, obtained, monitored, stored, recorded, and/or analyzed, preferably comprises, for example, working time, current, voltage, power, and so forth from, for example, the vacuum motor, lithium-ion battery, transaxle, brush deck motor, and other components of the floor cleaning machine assembly. This data or information is preferably received at the PCB 518 (FIG. 14) associated with the lithium-ion battery positioned in the floor cleaning machine 100. That is, the PCB 518 controls the operations of each of the components of the device. As described above, the operational data for each of these components can be captured and logged by the PCB 518 and stored in memory on the PCB 518. In other embodiments, operational data can be stored in memory on the PCB 518 and transmitted asynchronously in batches (according to memory size) to the management server 620. In some embodiments, the operational data can be streamed from the PCB 518 to the management server 620 synchronously.

Each device can be managed by assignment of a device ID by the management system. The device ID can be an assigned number, a SIM card number, an IMEI, a MAC address, an IP address, or other similar unique identifier. The device ID can be appended to each communication transmitted by the PCB 518 to the management server 620.

Stored data or information is preferably analyzed by the management server 620 for parameter compliance, and if, necessary such data or information is then communicated to, for example, an end user, servicing personal, and/or owner. For example, the owner of a floor cleaning machine assembly can set a threshold of hours of operation for the device that are required per week. If the floor cleaning machine assembly is not operated for a period of time that meets or exceeds this threshold, the floor cleaning machine assembly is identified by the management system 620.

The transfer of data with regard to each individual machine will help end users better plan for number of machines and employees at each individual work site. Companies with sizeable cleaning staff, (e.g., contact cleaning companies) will find it relevant and useful.

In one embodiment the data or information with regard to usage of each individual machine is collected and transmitted daily at a specific time to, for example, the management server. This will allow end users, as well as, distributors and dealers to access the information that they need, so as to monitor usage of these machines and allow them to extract maximum efficiency during operations. In another embodiment of the present invention, other than information for individual days, cumulative totals and averages are readily available too, and the information is preferably updated through the lifespan of the floor cleaning machine assembly. Examples of data or information uploaded on a daily basis include, for example, the number of hours and specific time the machine was in operation during the previous 24 hours, the monthly total hours for machine usage, and the total hours of machine usage. Furthermore, the present invention enables recording and analysis of an accumulation total for working parts like batteries, vacuum motors, transaxles and brush motors. Since each component has a lifespan, it will help distributors, dealers, and owners selectively monitor the exact time when these components (e.g., vacuum motor, brush motor and batteries) need to be changed instead of waiting for them to break down, which will affect the working efficiency of the end users. Another important advantage of having this data or information transfer is that in the event the machine breaks down, (e.g., the vacuum motor, brush motor, etcetera stops working), what has broken down will be selectively transmitted to the appropriate servicing personnel by email and/or cell phone text messaging that is/are responsible for the repairs and maintenance of the machines, management of the end user, and so forth.

Figure 16:
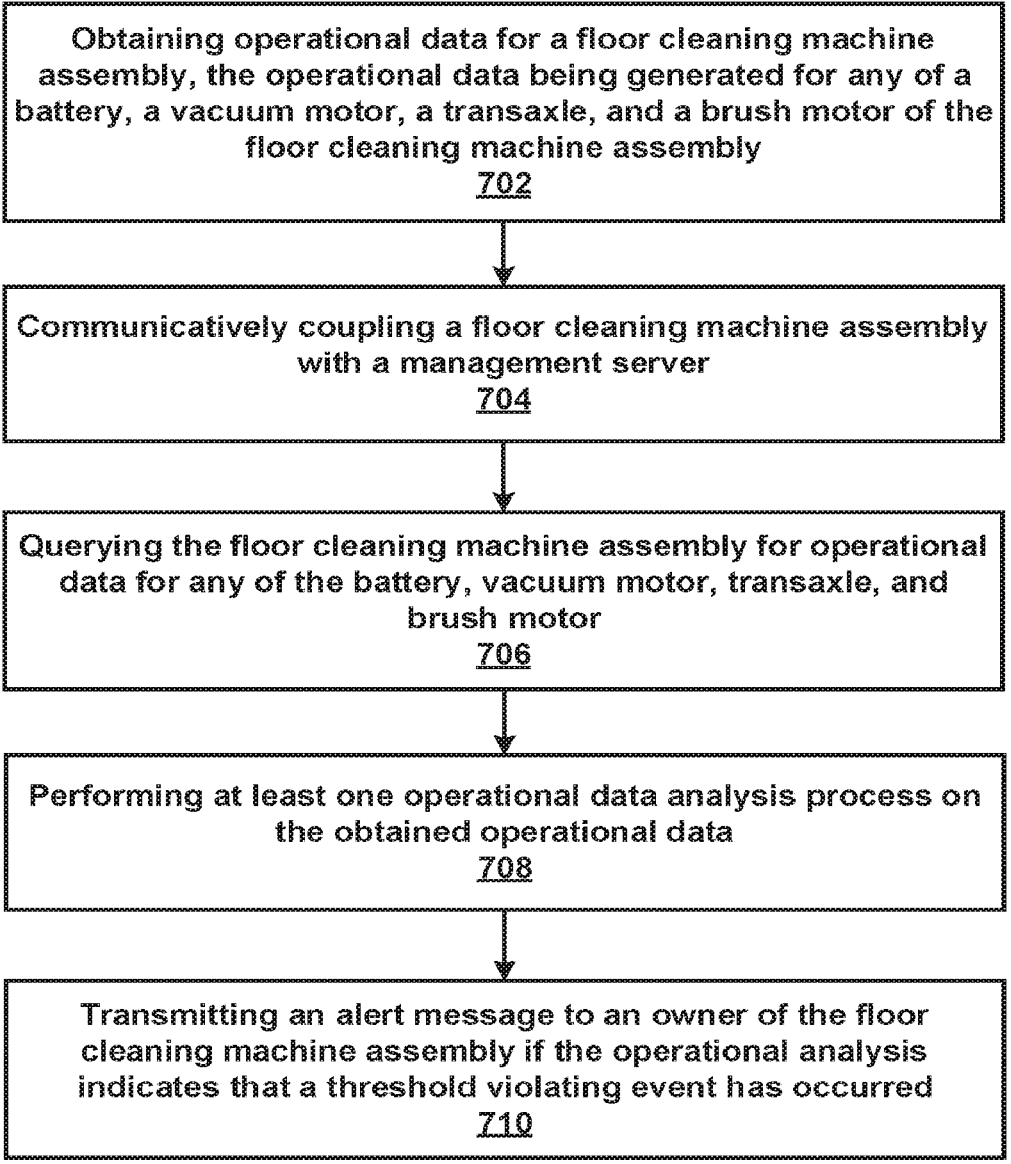
FIG. 16 of the drawings is a flow chart of a method in accordance with the present invention.

FIG. 16 is a flowchart of an example method of the present technology. The method includes obtaining 702 operational data for a floor cleaning machine assembly, the operational data being generated for any of a battery, a vacuum motor, a transaxle, and a brush motor of the floor cleaning machine assembly.

As mentioned above, this operational data can be gathered by a PCB (such as PCB 518 of FIG. 5) during operation of the floor cleaning machine assembly.

The method also comprises communicatively coupling 704 a floor cleaning machine assembly with a management server. As mentioned above, this could comprise a wireless communication module of the PCB 518 coupling with the management server over a network connection.

Once the floor cleaning machine assembly and the management server are communicatively coupled with one another, the method can further comprise the management server querying 706 the floor cleaning machine assembly for operational data for any of the battery, vacuum motor, transaxle, and brush motor. For example, the management server can request battery related operational data from the floor cleaning machine assembly. As mentioned above, this operational data can be stored on the floor cleaning machine assembly in memory of the PCB. In another example, the management server can request operational data for the vacuum and brush motors.

In another embodiment, the PCB can upload all operational data gathered since a last communication session with the management server. This operational data can include operational data for each of the battery, vacuum motor, transaxle, and brush motor.

In some embodiments, the management server is performing 708 at least one operational data analysis process on the obtained operational data.

Examples of operational data analysis include in one example, comparing the operational time frames for the floor cleaning machine assembly to an expected operational time frame. For example, the owner of a building will determine an operational time frame that the floor cleaning machine assembly should be utilized for. This operational time frame can be calculated from an expected time based on building square footage, or any other quantifiable metric that can be used to set an operational time frame threshold. Once this threshold is established, the management server can compare the actual operational time frame utilized over a given period of time to the operational time frame threshold. If the actual time does not meet or exceed the operational time frame threshold, the management server can alert the owner.

Thus, in some embodiments, the method includes transmitting 710 an alert message to an owner of the floor cleaning machine assembly if the operational analysis indicates that a threshold violating event has occurred. To be sure, a threshold violating event is any event in which operational data for one or more components of the floor cleaning machine assembly do not appropriately compare with an operational threshold.

In another example, an operational threshold could include a minimum charging time frame for the floor cleaning machine assembly. If the floor cleaning machine assembly is not charged for an appropriate amount of time, the battery operation of the floor cleaning machine assembly can be compromised.

In another example, an operational threshold can be set for the brush motor, which can include a comparison with another operational metric such as total operational time. Assume that the total operational time (e.g., power on to power off) for the floor cleaning machine assembly is one hour, but the brush motor is only operational for fifteen minutes of the one hour, it can be deduced that the floor cleaning machine assembly was not in actual use for the entire hour.

Additional metrics can be gathered by tracking revolutions of the transaxle, which can be extrapolated into square foot coverage of the floor cleaning machine assembly. Ideally, transaxle revolutions should be compared to overall operational time to ensure that the floor cleaning machine assembly is moving during power on periods. If the floor cleaning machine assembly is left on when no work is being accomplished, this can lead to unnecessary battery usage.

Knowledge of the approximate square footage of a cleaning area can also be used to determine if the floor cleaning machine assembly is being utilized properly. For example, if by counting transaxle revolutions that the floor cleaning machine assembly has only cleaned approximately 400 square feet, when the total expected square footage for the cleaning area is 2,000 square feet, the management server can detect this discrepancy and transmit an alert message to the owner or another interested party.

Figure 17:
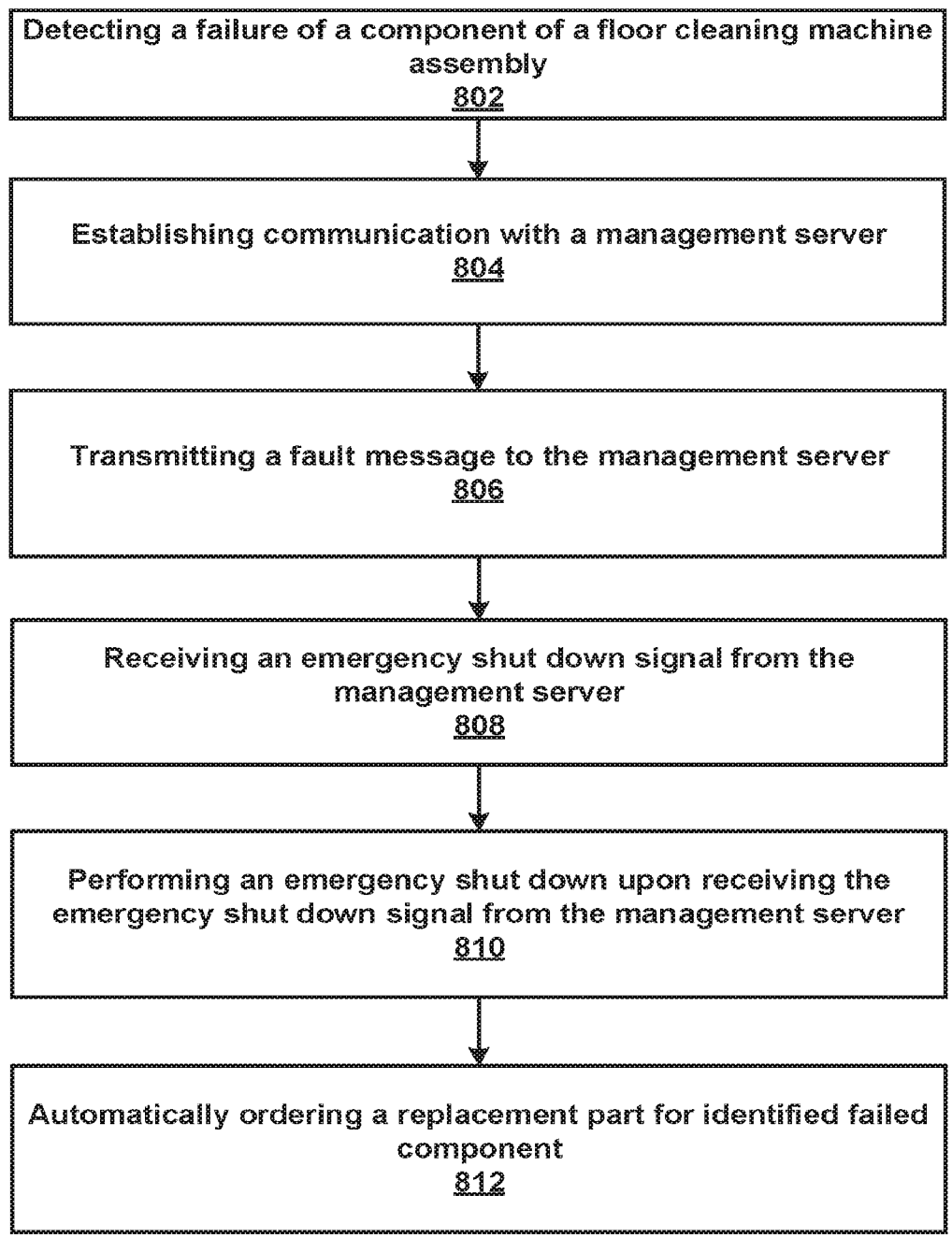
FIG. 17 of the drawings is a flow chart of another method in accordance with the present invention.

FIG. 17 is another flowchart of an example method of the present technology. The method includes a step of detecting 802 a failure of a component of a floor cleaning machine assembly during operation of the detecting 802 a failure of a component of a floor cleaning machine assembly during operation or startup of the floor cleaning machine assembly. For example, the PCB can maintain a set of operational thresholds for each component of the floor cleaning machine assembly such as the battery, vacuum motor, transaxle, and brush motor. Whenever any of these components is operating below this expected operational threshold, the failure can be established.

Upon detection of a failure, the method includes the PCB establishing 804 communication with a management server, as well as a step of transmitting 806 a fault message to the management server. The fault message can include an indication as to the component that failed, such as a battery, vacuum motor, transaxle, and brush motor.

If the failure involves a component of the floor cleaning machine assembly that could cause the floor cleaning machine assembly to be a safety hazard, the method can include the floor cleaning machine assembly receiving 808 an emergency shut down signal from the management server. The method also includes performing 810 an emergency shut down upon receiving the emergency shut down signal from the management server. Examples of emergency shut down procedures are described in greater detail supra.

In one embodiment, the method includes an optional step of automatically ordering 812 a replacement part for identified failed component. The floor cleaning machine assembly can communicate directly with a third party system over the network to order the replacement part. In another embodiment, the management server can identify the failed component and perform a lookup of the manufacturer of the failed component and forward the request to the third party system or a local inventory system. The management server can order the part automatically as the fault message is received. In another example, a replacement component in inventory can be identified and identified in a repair ticket that is transmitted to a repair technician.

In some embodiments, the present invention enables upgrades to the software that end users are using that may address, for example, compatibility issues, or other necessary upgrades. In one embodiment, the management server can push updates to the floor cleaning machine assembly during operational data transfer operations, or upon powering up the floor cleaning machine assembly. For example, each time the floor cleaning machine assembly is powered on, the PCB can link with the management server and query the management server for updates. This can all occur transparently to the end user, unless a short pause in operation of the floor cleaning machine assembly is required to implement the update or for safety reasons.

FIG. 18 is a diagrammatic representation of an example machine in the form of a computer system 900, within which a set of instructions for causing the machine to perform any one or more of the methodologies discussed herein may be executed. In various example embodiments, the machine operates as a standalone device or may be connected (e.g., networked) to other machines. In a networked deployment, the machine may operate in the capacity of a server or a client machine in a server-client network environment, or as a peer machine in a peer-to-peer (or distributed) network environment. The machine may be a personal computer (PC), a tablet PC, a set-top box (STB), a personal digital assistant (PDA), a cellular telephone, a portable music player (e.g., a portable hard drive audio device such as an Moving Picture Experts Group Audio Layer 3 (MP3) player), a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 900 includes a processor or multiple processors 905 (e.g., a central processing unit (CPU), a graphics processing unit (GPU), or both), and a main memory 910 and static memory 915, which communicate with each other via a bus 920. The computer system 900 may further include a video display 935 (e.g., a liquid crystal display (LCD)). The computer system 900 may also include an alpha-numeric input device(s) 930 (e.g., a keyboard), a cursor control device (e.g., a mouse), a voice recognition or biometric verification unit (not shown), a drive unit 937 (also referred to as disk drive unit), a signal generation device 940 (e.g., a speaker), and a network interface device 945. The computer system 900 may further include a data encryption module (not shown) to encrypt data.

The disk drive unit 937 includes a computer or machine-readable medium 950 on which is stored one or more sets of instructions and data structures (e.g., instructions 955) embodying or utilizing any one or more of the methodologies or functions described herein. The instructions 955 may also reside, completely or at least partially, within the main memory 10 and/or within the processors 905 during execution thereof by the computer system 900. The main memory 910 and the processors 905 may also constitute machine-readable media.

The instructions 955 may further be transmitted or received over a network via the network interface device 945 utilizing any one of a number of well-known transfer protocols (e.g., Hyper Text Transfer Protocol (HTTP)). While the machine-readable medium 950 is shown in an example embodiment to be a single medium, the term "computer-readable medium" should be taken to include a single medium or multiple media (e.g., a centralized or distributed database and/or associated caches and servers) that store the one or more sets of instructions. The term "computer-readable medium" shall also be taken to include any medium that is capable of storing, encoding, or carrying a set of instructions for execution by the machine and that causes the machine to perform any one or more of the methodologies of the present application, or that is capable of storing, encoding, or carrying data structures utilized by or associated with such a set of instructions. The term "computer-readable medium" shall accordingly be taken to include, but not be limited to, solid-state memories, optical and magnetic media, and carrier wave signals. Such media may also include, without limitation, hard disks, floppy disks, flash memory cards, digital video disks, random access memory (RAM), read only memory (ROM), and the like. The example embodiments described herein may be implemented in an operating environment comprising software installed on a computer, in hardware, or in a combination of software and hardware.

One skilled in the art will recognize that the Internet service may be configured to provide Internet access to one or more computing devices that are coupled to the Internet service, and that the computing devices may include one or more processors, buses, memory devices, display devices, input/output devices, and the like. Furthermore, those skilled in the art may appreciate that the Internet service may be coupled to one or more databases, repositories, servers, and the like, which may be utilized in order to implement any of the embodiments of the disclosure as described herein.

The corresponding structures, materials, acts, and equivalents of all means or step plus function elements in the claims below are intended to include any structure, material, or act for performing the function in combination with other claimed elements as specifically claimed. The description of the present technology has been presented for purposes of illustration and description, but is not intended to be exhaustive or limited to the present technology in the form disclosed. Many modifications and variations will be apparent to those of ordinary skill in the art without departing from the scope and spirit of the present technology. Exemplary embodiments were chosen and described in order to best explain the principles of the present technology and its practical application, and to enable others of ordinary skill in the art to understand the present technology for various embodiments with various modifications as are suited to the particular use contemplated.

Aspects of the present technology are described above with reference to flowchart illustrations and/or block diagrams of methods, apparatus (systems) and computer program products according to embodiments of the present technology. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

The foregoing description merely explains and illustrates the invention and the invention is not limited thereto except insofar as the appended claims are so limited, as those skilled in the art who have the disclosure before them will be able to make modifications without departing from the scope of the invention.

What is claimed is:

1. A method of operating an intelligent system of controlling a plurality of machines, comprising:
    (a) receiving, by one or more servers over a wireless network, operational data generated or collected onboard each of the plurality of machines;
    (b) processing the operational data to extract operational analytics for each of the plurality of machines, wherein the operational analytics comprises an operational status, maintenance status, power level, location, utilization rate, and/or component lifespan for each of the plurality of machines;
    (c) comparing the operational data to one or more threshold operating conditions for each of the plurality of machines; and
    (d) controlling, over the wireless network, the plurality of machines based at least in part on the comparison in (c).

2. The method of claim 1, wherein the operational data comprises one or more metrics associated with the plurality of machines, and wherein the one or more metrics comprise a machine operational time, a component operational time, a current level, a voltage level, charge time, and/or a charge amount for each of the plurality of machines.

3. The method of claim 2, wherein the charge time includes an amount of time a machine has been charged, wherein the one or more threshold operating conditions includes a charge time threshold including a minimum amount of time the machine should be charged to operate the machine, and further comprising, between (c) and (d), determining that one or more machines of the plurality of machines did not charge enough.

4. The method of claim 2, wherein the machine operational time includes an amount of time that a machine of the plurality of machines was in operation during a cleaning session, and wherein the component operational time includes an amount of time a component of the machine was in operation during the cleaning session.

5. The method of claim 4, further comprising determining that an actual cleaning time of the machine of the plurality of machines is less than the machine operational time based at least in part on the comparison in (c).

6. The method of claim 4, wherein the operational data further includes a number of revolutions that a transaxle of the machine of the plurality of machines made during the cleaning session, and wherein method further comprises:
    calculating the component operational time of the transaxle based at least in part the number of revolutions; and
    determining, based at least in part on determining that the component operational time is less than the machine operational time, that an actual cleaning time of the machine is less than the machine operational time.

7. The method of claim 4, wherein the operational data further includes an expected cleaned area and a number of revolutions that a transaxle of the machine of the plurality of machines made during the cleaning session, and wherein the method further comprises:

calculating a cleaned area based at least in part on the number of revolutions made by the transaxle; and determining, based at least in part on determining that the cleaned area is less than the expected cleaned area, that an actual cleaning time of the machine is less than the machine operational time.

8. The method of claim 1, wherein the plurality of machines comprises one or more automated or remotely controllable cleaning machines.

9. The method of claim 1, further comprising, in (c), representing the plurality of machines as a plurality of nodes within the wireless network on the one or more servers.

10. The method of claim 1, further comprising, prior to (a):

logging and storing the operational data in memory onboard the plurality of machines; and asynchronously transmitting the operational data in batches by the plurality of machines to the one or more servers.

11. The method of claim 1, further comprising, prior to (a), synchronously transmitting the operational data from the plurality of machines to the one or more servers as the operational data is being collected.

12. The method of claim 1, further comprising, prior to (a):

assigning each of the plurality of machines a device identity (ID); and appending the device ID for a select machine to the operational data for the select machine.

13. The method of claim 12, wherein the device ID includes an assigned number, a SIM card number, an IMEI, a MAC address, or an IP address.

14. The method of claim 1, wherein the receiving in (a) occurs at a predetermined time interval.

15. The method of claim 1, wherein the operational analytics further comprises a total accumulated usage or operational hours for one or more components within each of the plurality of machines, and wherein the one or more components comprises a power source, a motor, and/or a movable mechanical part.

16. The method of claim 15, wherein the operational analytics further comprises one or more recommended actions for changing or replacing the one or more components prior to their expected failure or lifespan expiration.

17. The method of claim 15, further comprising, in or after (d), generating one or more notifications upon detecting that one or more of the machines are experiencing one or more technical issues associated with the one or more components operating outside of one or more expected operational ranges or thresholds.

18. The method of claim 17, further comprising, in or after (d), transmitting the one or more notifications to servicing personnel using a software application, electronic mail and/or mobile messages of the servicing personnel.

19. The method of claim 15, further comprising, in (d), generating a set of instructions for automatically and remotely powering down the one or more machines that are experiencing the one or more technical issues.

20. The method of claim 1, wherein the operational analytics is useable to determine an optimal operating or utilization efficiency for each of the plurality of machines.

* * * * *